United States Patent
Feng

(10) Patent No.: US 10,020,980 B2
(45) Date of Patent: Jul. 10, 2018

(54) ARBITRATION PROCESSING METHOD AFTER CLUSTER BRAIN SPLIT, QUORUM STORAGE APPARATUS, AND SYSTEM

(71) Applicant: HUAWEI TECHNOLOGIES CO., LTD., Shenzhen, Guangdong (CN)

(72) Inventor: Rui Feng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/636,340

(22) Filed: Jun. 28, 2017

(65) Prior Publication Data

US 2017/0302502 A1 Oct. 19, 2017

Related U.S. Application Data

(63) Continuation of application No. PCT/CN2015/086147, filed on Aug. 5, 2015.

(30) Foreign Application Priority Data

Dec. 31, 2014 (WO) ................ PCT/CN2014/095892

(51) Int. Cl.
| | | |
|---|---|---|
| *G06F 15/16* | (2006.01) | |
| *H04L 12/24* | (2006.01) | |
| *H04L 29/08* | (2006.01) | |

(52) U.S. Cl.
CPC ........ *H04L 41/044* (2013.01); *H04L 41/0659* (2013.01); *H04L 41/0672* (2013.01); *H04L 67/10* (2013.01)

(58) Field of Classification Search
CPC ............... H04L 41/044; H04L 41/0659; H04L 41/0672; H04L 67/10

(Continued)

(56) References Cited

U.S. PATENT DOCUMENTS 6,449,641 B1  9/2002  Moiin et al.
6,487,622 B1  11/2002  Coskrey, IV et al.
(Continued)

FOREIGN PATENT DOCUMENTS

CN  102308559 A  1/2012
CN  102402395 A  4/2012
(Continued)

OTHER PUBLICATIONS

"Split-Brain Consensus"—Burke et al, Stanford University, Semantics Scholar, Dec. 2014 https://pdfs.semanticscholar.org/fe79/03646d9b6268f2f0a904f0a7b588d716b6a7.pdf.*

(Continued)

*Primary Examiner* — Randy Scott
(74) *Attorney, Agent, or Firm* — Huawei Technologies Co., Ltd.

(57) ABSTRACT

The present disclosure discloses an arbitration processing solution when brain split occurs in cluster. The solution includes: receiving, by the quorum storage apparatus, first master quorum node preemption requests within a first master quorum node preemption detection period sent by the at least two quorum nodes when brain split occurs in the cluster; sending, by the quorum storage apparatus, a first master quorum node preemption success response message to the initial master quorum node when the first master quorum node preemption request sent by the initial master quorum node is received; where the first master quorum node preemption success response message indicates the initial master quorum node succeeds in master quorum node preemption.

23 Claims, 9 Drawing Sheets

(58) Field of Classification Search
USPC ............... 709/202, 204, 205, 223, 224, 229; 370/216, 360, 419

See application file for complete search history.

(56) References Cited

U.S. PATENT DOCUMENTS

| | | | |
|---|---|---|---|
| 6,615,256 | B1 | 9/2003 | Van Ingen et al. |
| 6,965,936 | B1 | 11/2005 | Wipfel et al. |
| 7,277,952 | B2 | 10/2007 | Nishanov et al. |
| 7,313,636 | B2 | 12/2007 | Qi |
| 7,496,782 | B1 | 2/2009 | Kownacki |
| 8,024,432 | B1 | 9/2011 | Sharma et al. |
| 8,108,715 | B1 | 1/2012 | Agarwal |
| 8,145,938 | B2 | 3/2012 | Gupta |
| 8,412,790 | B2 * | 4/2013 | Shim ............... G06F 11/1425 709/210 |
| 8,443,231 | B2 | 5/2013 | Abraham et al. |
| 8,484,510 | B2 | 7/2013 | Shankar et al. |
| 8,699,322 | B1 | 4/2014 | Tawri et al. |
| 8,738,701 | B2 | 5/2014 | Padmanaban et al. |
| 2005/0132154 | A1 * | 6/2005 | Rao ..................... H04L 67/1097 711/162 |
| 2005/0262382 | A1 * | 11/2005 | Bain ..................... G06F 9/52 714/4.4 |
| 2007/0022138 | A1 | 1/2007 | Erasani et al. |
| 2007/0168507 | A1 | 7/2007 | Das et al. |
| 2008/0184061 | A1 | 7/2008 | Tripathi et al. |
| 2008/0225837 | A1 * | 9/2008 | Brown ............... H04L 67/1008 370/360 |
| 2010/0205273 | A1 | 8/2010 | Shim |
| 2013/0139219 | A1 | 5/2013 | Cai |

FOREIGN PATENT DOCUMENTS

| | | |
|---|---|---|
| CN | 102420820 A | 4/2012 |
| CN | 102594596 A | 7/2012 |
| CN | 102904946 A | 1/2013 |
| CN | 103532748 A | 1/2014 |
| CN | 103647820 A | 3/2014 |
| CN | 103684941 A | 3/2014 |
| CN | 104158707 A | 11/2014 |
| EP | 1908261 A1 | 4/2008 |
| JP | 2006048477 A | 2/2006 |
| JP | 2010186472 A | 8/2010 |
| JP | 2012-173996 A | 9/2012 |

OTHER PUBLICATIONS

Wilkins, R.S. et al., "Disaster Tolerant Wolfpack Geo-Clusters", Proceedings 2002 IEEE International Conference on IEEE, Sep. 2002, XP10621879, 6 pages.

"IPTables rule to allow all outbound locally originating traffic?" Sep. 18, 2012, from http://serverfault.com/questions/429400/iptables-rule-to-allow-all-outbound-locally-originating-traffic, 1 page.

Iptable: "Linux: 25 Iptables Netfilter Firewall Examples for New SysAdmins", Dec. 13, 2011, from http://www.cyberciti.biz/tips/linux-iptables-examples.html, 48 pages.

Cluster Suite Overview, 2009, from https://access.redhat.com/site/documentation/zh-CN/Red_Hat_Enterprise_Linux/5/html/Cluster_Suite_Overview/s2-fencing-overview-CSO.html, 7 pages.

Fencing GNBD server nodes, from https://centos.org/docs/5/html/5.2/Global_Network_Block_Device/s1-gnbd-mp-sn.html, downloaded Sep. 2017, 1 page.

About I/O fencing configuration files, from https://sort.symantec.com/public/documents/sfha/6.0/aix/productguides/html/sfcfs_install/ch08s04.htm, downloaded Sep. 2017 3 pages.

Creating the fence.ccs file, from https://access.redhat.com/site/documentation/en-US/Red_Hat_Enterprise_Linux/3/html/GFS_6.0_Administration_Guide/s1-sf-fence.html, downloaded Sep. 2017, 10 pages.

Enabling SCSI-3 PR for the DB2 pureScale feature (Linux), from https://www.ibm.com/support/knowledgecenter/SSEPGG_9.8.0/com.ibm.db2.luw.sd.doc/doc/t0058724.html, downloaded Sep. 2017, 3 pages.

Fencing (computing), from http://en.wikipedia.org/wiki/Fencing_%28computing%29, page last edited Dec. 2016, 2 pages.

Enabling and disabling persistent reserve, from https://www.ibm.com/support/knowledgecenter/SSFKCN_4.1.0/com.ibm.cluster.gpfs.v4r1.gpfs100.doc/bl1adm_enablpr.htm, Downloaded Oct. 2017, 1 page.

Understanding persistent reserve, from https://www.ibm.com/support/knowledgecenter/SSFKCN_4.1.0/com.ibm.cluster.gpfs.v4r1.gpfs500.doc/bl1pdg_understandpr.htm, downloaded Sep. 2017, 2 pages.

OCFS2 1.2—Frequently Asked Questions, from https://oss.oracle.com/projects/ocfs2/dist/documentation/ocfs2_faq.html#QUORUM, downloaded Sep. 2017, 15 pages.

Donald K. Burleson, "Oracle RAC Tips, Veritas I/O Fencing and SCSI-3 Persistency", from http://www.oracle-training.cc.teas_elite_rac24.htm, downloaded Sep. 2017, 2 pages.

Markus Michalewicz, "An Oracle White Paper: Oracle Clusterware 11g release 2", Sep. 2010, from http://www.oracle.com/technetwork/database/clusterware/overview/oracle-clusterware-11grel2-owp-1-129843.pdf, 19 pages.

DpANS Project T10/1416-D, "Information Technology—SCSI primary commands-3 (SPC-3)", Ralph Weber, Ed., Revision 23, May 4, 2005, 496 pages.

Ramdev, "VCS (Veritas Cluster Services) Beginners lesson—Cluster Membership and IO Fencing", Jul. 23, 2016, from http://unixadminschool.com/blog/2011/08/vcs-veriras-cluster-services-beginners-lesson-cluster-membership-io-fencing/, 15 pages.

Jinghong Zhu, "Lock Your Hard Disks", from https://www.ibm.com/developerworks/cn/aix/library/1308_zhujh_lockhdisk/, Jul. 29, 2013, 19 pages.

* cited by examiner

ARBITRATION PROCESSING METHOD AFTER CLUSTER BRAIN SPLIT, QUORUM STORAGE APPARATUS, AND SYSTEM

CROSS-REFERENCE TO RELATED APPLICATIONS

This application is a continuation of International Application No. PCT/CN2015/086147, filed on Aug. 5, 2015, which claims priority to International Application No. PCT/CN2014/095892, filed on Dec. 31, 2014. The disclosures of the aforementioned applications are hereby incorporated by reference in their entireties.

TECHNICAL FIELD

The present disclosure relates to the field of cloud computing technologies, and more specifically, to an arbitration processing method after cluster brain split, a quorum storage apparatus, and a system.

BACKGROUND

A cluster is formed by two or more computers, and each computer is referred to as a node in the cluster. Because a network is faulty (for example, a switch in the network is faulty), a cluster may be split into two or more node groups, and this phenomenon is called a brain split. After the brain split occurs in the cluster, each node group in the split of two or more node groups cannot detect the existence of another node group by using heart beat information or lease information, and consequently, the node group may consider that nodes in the another node group are faulty. In this way, nodes in the node groups may initiate access to a shared storage resource (for example, a storage disk) within a same period, which may cause a data access error. In this case, cluster management software generally arbitrates, by using a particular algorithm, which node group wins and continues works of the original cluster. Nodes in a node group that fails need to be restarted and perform an operation of re-joining the cluster.

In the prior art, the following manner is used to resolve the foregoing problem: an algorithm that quorum nodes vote is used. That is, some nodes are selected from all nodes in a cluster and are set as quorum nodes. When brain split occurs, a quantity of quorum nodes surviving in the cluster is N. When the brain split occurs and the original cluster is split into two node groups, a node in a node group may determine connectivity between the node and another node by detecting heart beat information or lease information of the another node. It is determined according to the detection that a node group including n quorum nodes forms a first node group and another node group including N−n quorum nodes forms a second node group. Each quorum node in the two node groups can detect a quantity of quorum nodes in the node group of the quorum node, and when detecting that the quantity of quorum nodes in the node group of the quorum node exceeds Round(N/2)+1 (Round(*) is a rounding function), considers that the node group of the quorum node is a main part (that is, a master node group determined through arbitration after the brain split) of the cluster after the brain split occurs. The node group continues works of the cluster. When a node in the other node group detects that a quantity of quorum nodes in the node group of the node is less than Round(N/2)+1, the node performs node restart, and re-joins a cluster formed by the node group that continues to work.

When a cluster is split into three or more node groups, because a quantity of quorum nodes in each node group cannot exceed Round(N/2)+1 (N is a total quantity of quorum nodes surviving in the cluster and N is a positive integer), a master node group cannot be determined through arbitration to continue works of the cluster.

SUMMARY

In view of this, embodiments of the present disclosure provide an arbitration processing method after cluster brain split, a quorum storage apparatus, and a system, which can effectively implement cluster arbitration processing after brain split, so that a cluster service is restored rapidly.

According to a first aspect, an arbitration processing method after cluster brain split is provided, applied to a system formed by a cluster and a quorum storage apparatus, where the cluster includes at least two quorum nodes and the quorum storage apparatus pre-records one of the at least two quorum nodes in the cluster as an initial master quorum node, and the method includes: after brain split occurs in the cluster, receiving, by the quorum storage apparatus, master quorum node preemption requests sent by the at least two quorum nodes in the cluster; starting, by the quorum storage apparatus, a master quorum node preemption detection period; determining, by the quorum storage apparatus, whether a master quorum node preemption request sent by the initial master quorum node is received within the master quorum node preemption detection period; if the master quorum node preemption request sent by the initial master quorum node is received within the master quorum node preemption detection period, setting, by the quorum storage apparatus, the initial master quorum node as a quorum node succeeding in master quorum node preemption; and sending, by the quorum storage apparatus, a master quorum node preemption success response message to the quorum node succeeding in master quorum node preemption.

With reference to the first aspect, in a first possible implementation manner, when determining that the master quorum node preemption request sent by the initial master quorum node is not received within the master quorum node preemption detection period, the quorum storage apparatus sets a quorum node sending the first master quorum node preemption request received after the master quorum node preemption detection period ends as a quorum node succeeding in master quorum node preemption, and sends a master quorum node preemption success response message to the quorum node succeeding in master quorum node preemption.

With reference to the first aspect or the first possible implementation manner, in a second possible implementation manner, after the master quorum node preemption detection period is started, the determining, by the quorum storage apparatus, whether a master quorum node preemption request sent by the initial master quorum node is received within the master quorum node preemption detection period specifically includes: within the master quorum node preemption detection period, caching, by the quorum storage apparatus, all master quorum node preemption requests received within the master quorum node preemption detection period, and determining, by the quorum storage apparatus, whether quorum nodes sending all the cached master quorum node preemption requests include the initial master quorum node; or within the master quorum node preemption detection period, sequentially determining, by the quorum storage apparatus, whether a quorum node sending each master quorum node preemption request received within the master quorum node preemption detection period is the initial master quorum node.

With reference to the second possible implementation manner of the first aspect, in a third possible implementation manner, after the quorum storage apparatus determines that the quorum nodes sending all the cached master quorum node preemption requests do not include the initial master quorum node, the method further includes: sending, by the quorum storage apparatus, a master quorum node preemption failure response message to each of the quorum nodes sending all the cached master quorum node preemption requests, so that the quorum nodes sending all the cached master quorum node preemption requests send new master quorum node preemption requests to the quorum storage apparatus again.

With reference to the second possible implementation manner of the first aspect, in a fourth possible implementation manner, after the quorum storage apparatus sequentially determines that the quorum node sending each master quorum node preemption request received within the master quorum node preemption detection period does not include the initial master quorum node, the method further includes: sending, by the quorum storage apparatus, a master quorum node preemption failure response message to the quorum node sending each master quorum node preemption request received within the master quorum node preemption detection period, so that the quorum node sending each master quorum node preemption request received within the master quorum node preemption detection period sends a new master quorum node preemption request to the quorum storage apparatus again.

With reference to the first aspect or any one of the foregoing possible implementation manners, in a fifth possible implementation manner, after the sending, by the quorum storage apparatus, a master quorum node preemption success response message to the quorum node succeeding in master quorum node preemption, the method further includes: receiving, by the quorum storage apparatus, a first permission control message sent by the quorum node succeeding in master quorum node preemption, where the first permission control message includes an identifier of a first-category quorum node that does not connect to the quorum node succeeding in master quorum node preemption in the at least two quorum nodes in the cluster; and sending, by the quorum storage apparatus, an access denial notification message to the first-category quorum node, to instruct the first-category quorum node to perform a node restart operation.

With reference to the first aspect or any one of the foregoing possible implementation manners, in a sixth possible implementation manner, after the sending, by the quorum storage apparatus, a master quorum node preemption success response message to the quorum node succeeding in master quorum node preemption, the method further includes: receiving, by the quorum storage apparatus, a second permission control message sent by the quorum node succeeding in master quorum node preemption, where the second permission control message includes an identifier of a second-category quorum node that connects to the quorum node succeeding in master quorum node preemption in the at least two quorum nodes; and sending, by the quorum storage apparatus, a master quorum node preemption failure notification message to the second-category quorum node, to instruct the second-category quorum node to stop sending a master quorum node preemption request to the quorum storage apparatus.

With reference to the first aspect or any one of the first to fourth possible implementation manners of the first aspect, in a seventh possible implementation manner, after the sending, by the quorum storage apparatus, a master quorum node preemption success response message to the quorum node succeeding in master quorum node preemption, the method further includes: receiving, by the quorum storage apparatus, a permission control message sent by the quorum node succeeding in master quorum node preemption, where the permission control message includes an identifier of another quorum node except the quorum node succeeding in master quorum node preemption in the at least two quorum nodes and access permission, of the another quorum node except the quorum node succeeding in master quorum node preemption in the at least two quorum nodes, for the quorum storage apparatus, and the access permission includes admission or denial; and sending, by the quorum storage apparatus, a notification message to the another quorum node except the quorum node succeeding in master quorum node preemption in the at least two quorum nodes according to the permission control message.

With reference to the seventh possible implementation manner of the first aspect, in an eighth possible implementation manner, for a first-category quorum node whose access permission is denial, the sending, by the quorum storage apparatus, a notification message to the another quorum node except the quorum node succeeding in master quorum node preemption in the at least two quorum nodes according to the permission control message specifically includes: sending, by the quorum storage apparatus, an access denial notification message to the first-category quorum node, to instruct the first-category quorum node to perform a node restart operation.

With reference to the seventh or eighth possible implementation manner of the first aspect, in a ninth possible implementation manner, for a second-category quorum node whose access permission is admission, the sending, by the quorum storage apparatus, a notification message to the another quorum node except the quorum node succeeding in master quorum node preemption in the at least two quorum nodes according to the permission control message specifically includes: sending, by the quorum storage apparatus, a master quorum node preemption failure notification message to the second-category quorum node, to instruct the second-category quorum node to stop sending a master quorum node preemption request to the quorum storage apparatus.

With reference to the fifth or eighth possible implementation manner of the first aspect, in a tenth possible implementation manner, after the sending, by the quorum storage apparatus, an access denial notification message to the first-category quorum node, the method further includes: sending, by the quorum storage apparatus, a notification message used to change a firewall policy to denial to the first-category quorum node, where the notification message used to change a firewall policy to denial is used to instruct the first-category quorum node to change a firewall policy in a firewall of the first-category quorum node to denial, to block a master quorum node preemption request sent by the first-category quorum node to the quorum storage apparatus.

With reference to the tenth possible implementation manner of the first aspect, in an eleventh possible implementation manner, after the first-category quorum node performs the restart operation and re-joins the cluster, the method further includes: sending, by the quorum storage apparatus, a notification message used to change a firewall policy to admission to the first-category quorum node, where the notification message used to change a firewall policy to admission is used to instruct the first-category quorum node to change the firewall policy in the firewall of the first-category quorum node to admission, to allow the first-category quorum node to send a master quorum node preemption request to the quorum storage apparatus.

According to a second aspect, a quorum storage apparatus for arbitration processing in a cluster is provided, applied to a system formed by a cluster and a quorum storage apparatus, where the cluster includes at least two quorum nodes and the quorum storage apparatus pre-configures one of the at least two quorum nodes in the cluster to an initial master quorum node, and the quorum storage apparatus includes: a receiving unit, configured to: after brain split occurs in the cluster, receive master quorum node preemption requests sent by the at least two quorum nodes; a starting unit, configured to start a master quorum node preemption detection period; a determining unit, configured to determine whether a master quorum node preemption request sent by the initial master quorum node is received within the master quorum node preemption detection period; an execution unit, configured to: when the master quorum node preemption request sent by the initial master quorum node is received within the master quorum node preemption detection period, set the initial master quorum node as a quorum node succeeding in master quorum node preemption; and a sending unit, configured to send a master quorum node preemption success response message to the quorum node succeeding in master quorum node preemption.

With reference to the second aspect, in a first possible implementation manner, the execution unit is further configured to: when it is determined that the master quorum node preemption request sent by the initial master quorum node is not received within the master quorum node preemption detection period, set a quorum node sending the first master quorum node preemption request received after the master quorum node preemption detection period ends as a quorum node succeeding in master quorum node preemption; and the sending unit is further configured to send a master quorum node preemption success response message to the quorum node succeeding in master quorum node preemption.

With reference to the second aspect or the first implementation manner, in a second possible implementation manner, the determining unit is, in some embodiments, configured to cache all master quorum node preemption requests received within the master quorum node preemption detection period, and determine whether quorum nodes sending all the cached master quorum node preemption requests include the initial master quorum node; or within the master quorum node preemption detection period, sequentially determine whether a quorum node sending each master quorum node preemption request received within the master quorum node preemption detection period is the initial master quorum node.

With reference to the second implementation manner of the second aspect, in a third possible implementation manner, the execution unit is further configured to: after the determining unit determines that the quorum nodes sending all the cached master quorum node preemption requests do not include the initial master quorum node, generate a master quorum node preemption failure response message; and the sending unit is further configured to send the master quorum node preemption failure response message to each of the quorum nodes sending all the cached master quorum node preemption requests, so that the quorum nodes sending all the cached master quorum node preemption requests send new master quorum node preemption requests to the quorum storage apparatus again.

With reference to the second possible implementation manner of the second aspect, in a fourth possible implementation manner, the execution unit is further configured to: after the determining unit determines that the quorum node sending each master quorum node preemption request received within the master quorum node preemption detection period does not include the initial master quorum node, generate a master quorum node preemption failure response message; and the sending unit is further configured to send the master quorum node preemption failure response message to the quorum node sending each master quorum node preemption request received within the master quorum node preemption detection period, so that the quorum node sending each master quorum node preemption request received within the master quorum node preemption detection period sends a new master quorum node preemption request to the quorum storage apparatus again.

With reference to the second aspect or any one of the first to fourth implementation manners, in a fifth possible implementation manner, the receiving unit is further configured to: after the sending unit sends a master quorum node preemption success response message to the quorum node succeeding in master quorum node preemption, receive a first permission control message sent by the quorum node succeeding in master quorum node preemption, where the first permission control message includes an identifier of a first-category quorum node that does not connect to the quorum node succeeding in master quorum node preemption in the at least two quorum nodes in the cluster; the execution unit is further configured to generate an access denial notification message according to the first permission control message sent by the quorum node succeeding in master quorum node preemption; and the sending unit is further configured to send the access denial notification message to the first-category quorum node, to instruct the first-category quorum node to perform a node restart operation.

With reference to the second aspect or any one of the first to fifth possible implementation manners of the second aspect, in a sixth possible implementation manner, the receiving unit is further configured to: after the sending unit sends a master quorum node preemption success response message to the quorum node succeeding in master quorum node preemption, receive a second permission control message sent by the quorum node succeeding in master quorum node preemption, where the second permission control message includes an identifier of a second-category quorum node that connects to the quorum node succeeding in master quorum node preemption in the at least two quorum nodes; the execution unit is further configured to generate a master quorum node preemption failure notification message according to the second permission control message sent by the quorum node succeeding in master quorum node preemption; and the sending unit is further configured to send the master quorum node preemption failure notification message to the second-category quorum node, to instruct the second-category quorum node to stop sending a master quorum node preemption request to the quorum storage apparatus.

With reference to the second aspect or any one of the first to fourth possible implementation manners of the second aspect, in a seventh possible implementation manner, the receiving unit is further configured to: after the sending unit sends a master quorum node preemption success response message to the quorum node succeeding in master quorum node preemption, receive a permission control message sent by the quorum node succeeding in master quorum node preemption, where the permission control message includes an identifier of another quorum node except the quorum node succeeding in master quorum node preemption in the at least two quorum nodes and access permission, of the another quorum node except the quorum node succeeding in master quorum node preemption in the at least two quorum nodes, for the quorum storage apparatus, and the access permission includes admission or denial; the execution unit is further configured to generate a notification message according to the permission control message; and the sending unit is further configured to send the notification message to the another quorum node except the quorum node succeeding in master quorum node preemption in the at least two quorum nodes.

With reference to the seventh possible implementation manner of the second aspect, in an eighth possible implementation manner, the execution unit is, in some embodiments, configured to generate an access denial notification message for a first-category quorum node whose access permission is denial; and the sending unit is, in some embodiments, configured to send the access denial notification message to the first-category quorum node whose access permission is denial, to instruct the first-category quorum node to perform a node restart operation.

With reference to the seventh or eighth possible implementation manner of the second aspect, in a ninth possible implementation manner, the execution unit is, in some embodiments, configured to generate a master quorum node preemption failure notification message for a second-category quorum node whose access permission is admission, to instruct the second-category quorum node to stop sending a master quorum node preemption request to the quorum storage apparatus; and the sending unit is, in some embodiments, configured to send the master quorum node preemption failure notification message to the second-category quorum node whose access permission is admission.

With reference to the fifth or eighth possible implementation manner of the second aspect, in a tenth possible implementation manner, the execution unit is further configured to: after the sending unit sends the access denial notification message to the first-category quorum node, generate, for the first-category quorum node, a notification message used to change a firewall policy to denial, where the notification message used to change a firewall policy to denial is used to instruct the first-category quorum node to change a firewall policy in a firewall of the first-category quorum node to denial, to block a master quorum node preemption request sent by the first-category quorum node to the quorum storage apparatus; and the sending unit is further configured to send the notification message used to change a firewall policy to denial to the first-category quorum node.

With reference to the tenth possible implementation manner of the second aspect, in an eleventh possible implementation manner, the execution unit is further configured to: after the first-category quorum node performs the restart operation and re-joins the cluster, generate, for the first-category quorum node, a notification message used to change a firewall policy to admission, where the notification message used to change a firewall policy to admission is used to instruct the first-category quorum node to change the firewall policy in the firewall of the first-category quorum node to admission, to allow the first-category quorum node to send a master quorum node preemption request to the quorum storage apparatus; and the sending unit is further configured to send the notification message used to change a firewall policy to admission to the first-category quorum node.

According to a third aspect, a storage apparatus is provided, where the storage apparatus includes: a processor, a memory, a communications interface, and a bus, where the processor, the memory, and the communications interface communicate with each other by using the bus; the communications interface is configured to communicate with at least two quorum nodes in a cluster; the memory is configured to store a program; and when the storage apparatus runs, the processor is configured to execute the program stored in the memory, to execute the method according to the first aspect or any possible implementation manner of the first aspect.

According to a fourth aspect, an arbitration processing system after cluster brain split is provided, where the system includes a cluster and the quorum storage apparatus according to the second aspect or any one of the possible implementation manners, where the cluster includes at least two quorum nodes, and the quorum storage apparatus pre-records one of the at least two quorum nodes in the cluster as an initial master quorum node.

A quorum storage apparatus is set in the embodiments of the present disclosure. The quorum storage apparatus pre-records one of at least two quorum nodes in a cluster as an initial master quorum node. After brain split occurs in the cluster, the quorum storage apparatus starts a master quorum node preemption detection period, and determines that a master quorum node preemption request sent by the initial master quorum node is received within the master quorum node preemption detection period. The quorum storage apparatus determines that the initial master quorum node is a quorum node succeeding in master quorum node preemption, and sends a master quorum node preemption success response message to the quorum node succeeding in master quorum node preemption. In the foregoing solutions, after the quorum storage apparatus receives the master quorum node preemption request of the initial master quorum node within the master quorum node preemption detection period, the quorum storage apparatus uses the initial master quorum node as a new master quorum node, which can resolve a problem that in a cluster recovery process, a cluster service is handed over due to switch of the master quorum node, thereby maintaining continuity of the service.

BRIEF DESCRIPTION OF DRAWINGS

To describe the technical solutions in the embodiments of the present disclosure more clearly, the following briefly introduces the accompanying drawings required for describing the embodiments of the present disclosure.

DESCRIPTION OF EMBODIMENTS

Figure 1:
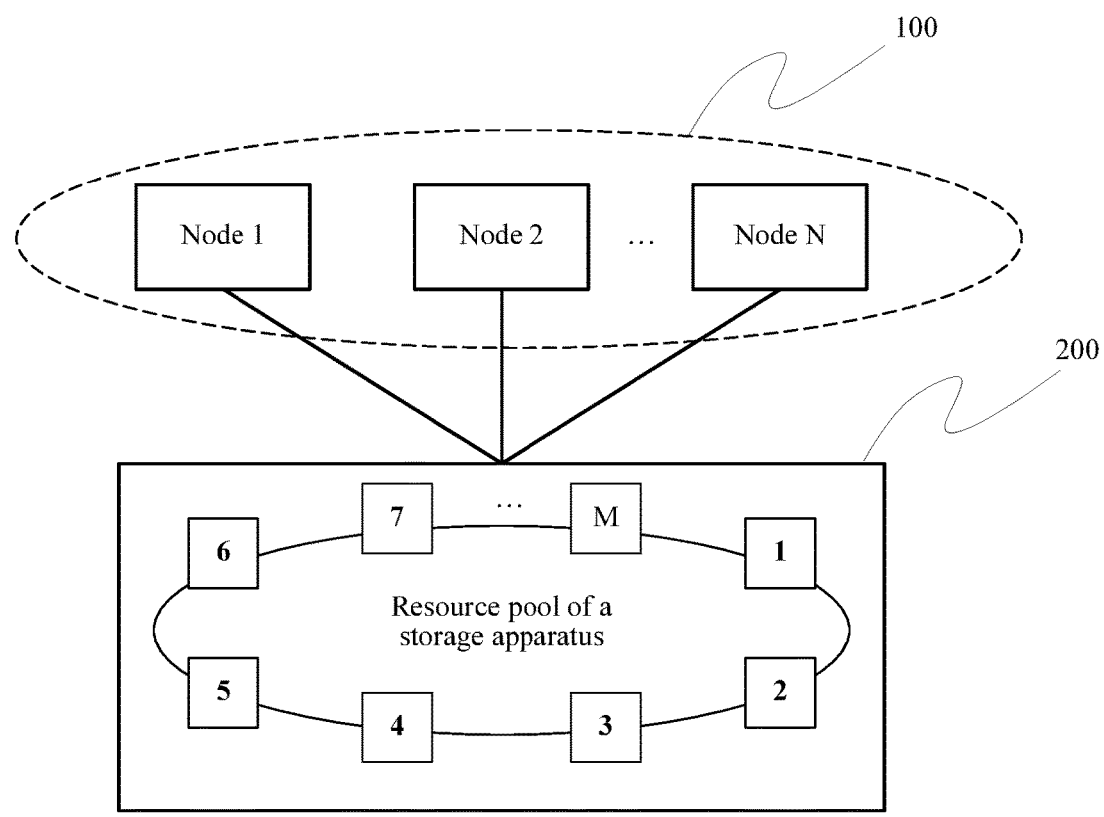
FIG. 1 is a schematic diagram of an architecture of a cluster system formed by a cluster and a storage apparatus according to an embodiment of the present disclosure.

The following clearly describes the technical solutions in the embodiments of the present disclosure with reference to the accompanying drawings in the embodiments of the present disclosure.

Generally, a program module includes a routine, a program, a component, a data structure, and another type of structure used to execute a particular task or implement a particular abstract data type. In addition, a person skilled in the art may understand that the embodiments may be implemented by another computer system, including a hand-held device, a multi-processor system, a micro-processor-based or programmable consumer electronics product, a small computer, a mainframe computer, and a similar computer device. The embodiments may also be implemented in a distributed computing environment in which a task is executed by a remote processing device connected by a communications network. In the distributed computing environment, the program module may be located in a storage device such as a local or remote memory.

The embodiments may be implemented as a computer-implemented process, a computing system, or a computer storage medium that stores a computer program, which is executed by a computer system or a computer program product and is formed by an instruction of an example process. For example, the computer readable storage medium may be implemented by one or more of a volatile computer memory, a non-volatile memory, a hard disk drive, a flash drive, a floppy disk or a compact disk, or a similar medium.

In this specification, the term "cluster" includes a group of independent computers interconnected by using a high-speed network, where the computers form a group and are managed in a single-system mode. Each computer in the cluster is referred to as a "node".

In this specification, the term "node" generally refers to a computing device used to execute one or more software programs in a network environment, and the "node" may also be implemented as a virtual node (a software program) executed on one or more computing devices of a server in a network. In specific implementation, the node may be a physical machine or a virtual machine installed on a physical machine.

In this specification, the term "brain split" refers to that because a network is faulty, a cluster is split into two or more node groups, and this phenomenon is referred to as brain split.

In this specification, the term "brain split arbitration" generally refers to that after brain split occurs in a cluster, an original cluster is split into several node groups formed by nodes, cluster management software generally determines, by using a particular algorithm, which node group in the several node groups is used as a master node group, and a process of determining a master node group is referred to as a brain split arbitration process.

In this specification, the term "master node group" refers to that after brain split occurs, a node group after the brain split is determined according to a brain split arbitration method and is used to continue works of the original cluster, and this node group is referred to as the master node group.

In this specification, the term "quorum node": when brain split causes the cluster to split into multiple node groups (which may be specifically network partitions), some nodes having special functions in the cluster generally participate in decision and perform brain split arbitration to determine which node group may survive to continue to provide a cluster service, and the other node groups are determined to be faulty and cannot continue to provide a cluster service, and these nodes participating in brain split arbitration are referred to as quorum nodes. Generally, only a small quantity of nodes in the cluster is referred to as quorum nodes, which may be pre-configured by a system.

In this specification, the term "master quorum node" refers to one of multiple quorum nodes in the cluster, and is used to determine that a node group in which the master quorum node is located is a master node group. When the cluster is split into multiple node groups because the brain split occurs in the cluster, the system determines the master quorum node, and the node group in which the master quorum node is located is used as the master node group to continue works of the original cluster. After the master quorum node is determined, a node connecting to the master quorum node in a network is obtained through detection by means of heart beat or lease, and a node group formed by the nodes is used as the master node group after the brain split occurs in the cluster, to continue services of the cluster.

In this specification, the term "master quorum node pre-emption request" refers to a request that is generated by a quorum node in a cluster when brain split occurs in the cluster and that is sent to a quorum storage apparatus to preempt a master quorum node, where the request generally includes an identifier of the quorum node. The identifier may be a marking manner such as an IP address or a number of the quorum node in the cluster.

In this specification, the term "quorum storage apparatus" refers to a storage apparatus that undertakes an arbitration function and finally determines a master quorum node in a master quorum node selection process. When the quorum storage apparatus performs an arbitration function, the quorum storage apparatus receives master quorum node pre-emption requests sent by quorum nodes and determines a master quorum node from the quorum nodes. Because in an existing application scenario, a storage disk is used as an arbitration apparatus to determine the master quorum node, the quorum storage apparatus is named. A person skilled in the art may understand that another apparatus that undertakes an arbitration function and that is not used for storage shall also fall within the explanation scope of the term "quorum storage apparatus".

In this specification, the term "firewall" generally refers to that: a device assisting in ensuring information security may allow or limit, according to a particular rule, transmitted data to pass through the device. In specific implementation, the firewall may be a piece of dedicated hardware or a set of software installed on general hardware.

In this specification, the term "IO access request" generally refers to a request that is received by a storage device and that is used to read or write data stored in the storage device.

In this specification, the term "connection" refers to connectivity in a network. A node in a cluster may determine, by means of heart beat detection or lease detection, connectivity between another node and the node. After brain split occurs in the cluster, the original cluster is split into several node groups. Nodes in a same node group detect existence of each other by means of heart beat detection or lease detection, which represents that the two nodes connect to each other. Nodes in different node groups cannot detect existence of each other by means of heart beat detection or lease detection, which represents that the two nodes do not connect to each other.

System Architecture of the Embodiments of the Present Disclosure

Before the embodiments of the present disclosure are described, a schematic diagram of an architecture of a cluster system formed by a cluster node and a storage apparatus is described first, as shown in FIG. 1. The system includes:

a cluster 100, formed by N nodes (N≥1 and N is an integer), where each node may be deployed on a physical node (for example, a server) or may be deployed on a virtual node (for example, a virtual machine) and is responsible for receiving a data access request sent by an application or a client and converting the data access request into an IO access request for the storage apparatus; and a storage apparatus resource pool 200, formed by M (M≥1 and M is an integer) storage apparatuses, where each storage apparatus may be understood as a storage device including storage management software and a storage medium. The M storage apparatuses in the storage apparatus resource pool 200 are connected in various manners. The M storage apparatuses shown in FIG. 1 are in a ring structure connection manner (which is merely an exemplary description). In an actual application, there may also be a star structure, a bus structure, a distributed structure, a tree structure, a mesh structure, a cellular structure, or the like, and details are not described in this embodiment of the present disclosure. In the storage apparatus resource pool 200, at least one storage apparatus may be used as a quorum storage apparatus, where the quorum storage apparatus is used to store an identifier of a master quorum node in a cluster, and the identifier may be an IP address, a number of the quorum node in the cluster, or the like.

The node in the cluster 100 and the storage apparatus in the storage apparatus resource pool 200 may be directly connected or connected by using a network (not shown in FIG. 1). Because these connection manners belong to the technology commonly known in the art, details are not described in this embodiment of the present disclosure.

P (P≥2, P is an integer, and P<N) nodes in the N nodes included in the cluster 100 may be used as quorum nodes, and these quorum nodes are selected and configured from the nodes by an administrator or another system. When brain split occurs in the cluster, the P quorum nodes separately send master quorum node preemption requests to the quorum storage apparatus. The quorum storage apparatus records an identifier of a quorum node succeeding in master quorum node preemption, and sends a master quorum node preemption success response message to the quorum node corresponding to the identifier, where the response message is used to notify the quorum node corresponding to the identifier that master quorum node preemption succeeds.

Method Embodiments of the Present Disclosure

Figure 2A:
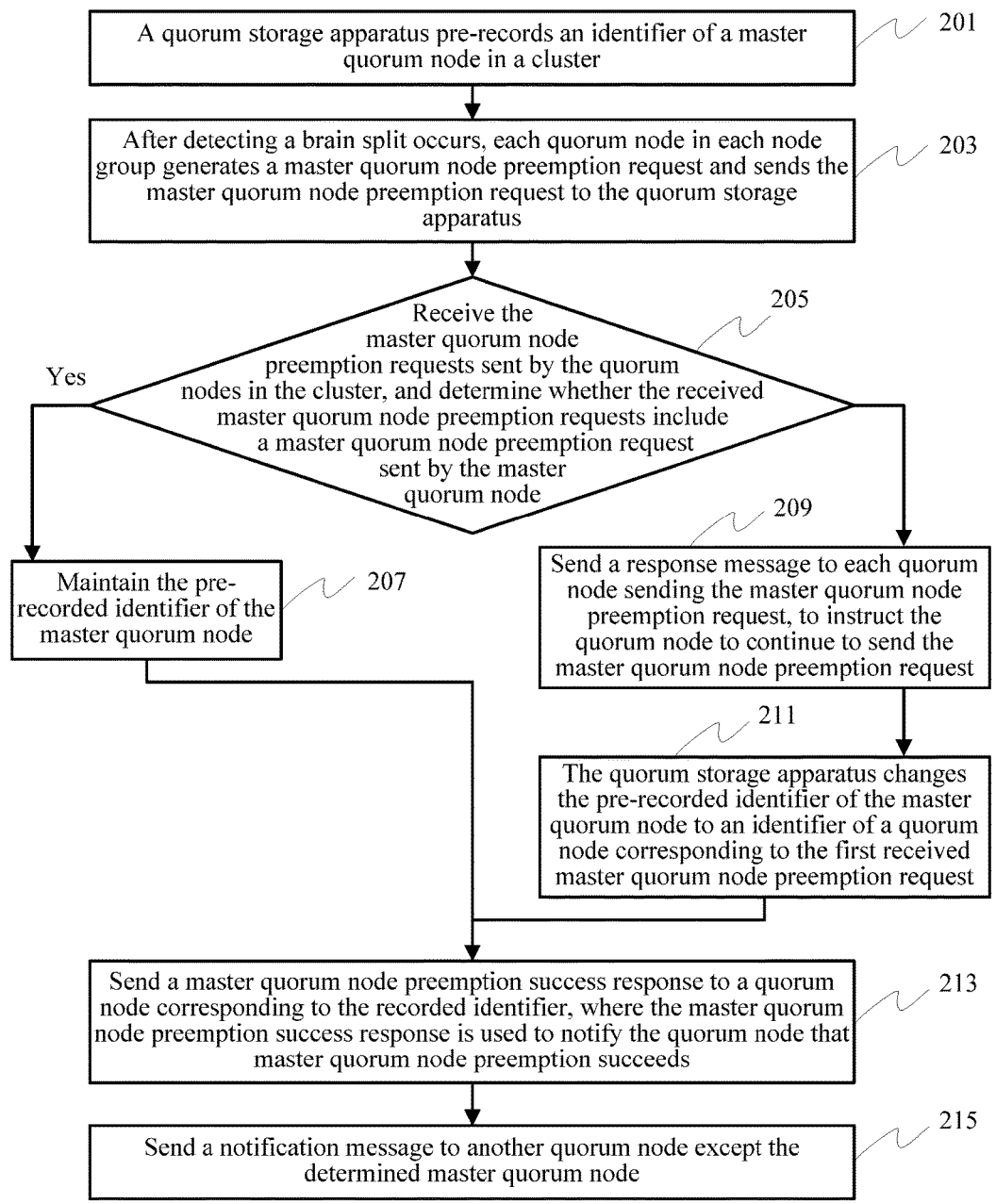
FIG. 2A to FIG. 2C are a schematic diagram of a first embodiment of an arbitration processing method after brain split according to the present disclosure.
Figure 2B:
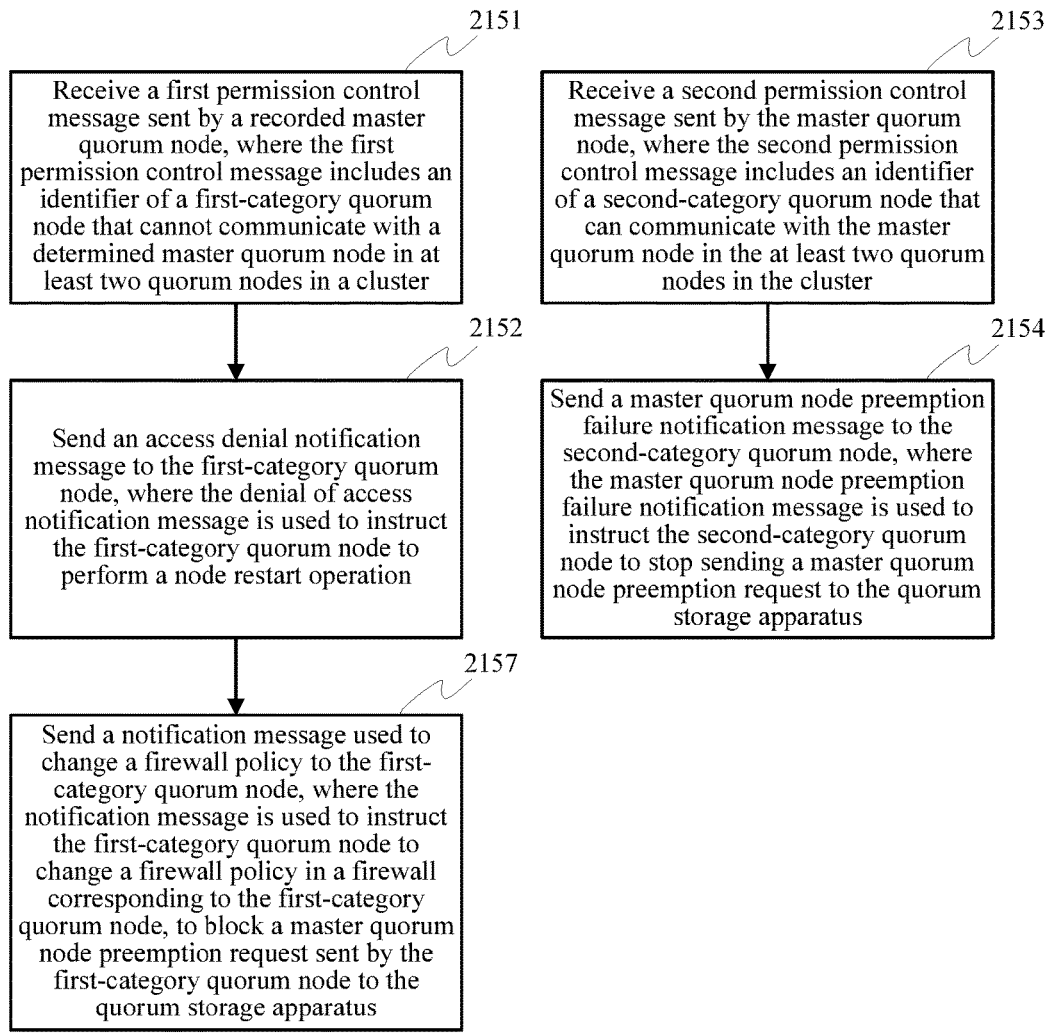
Figure 2C:
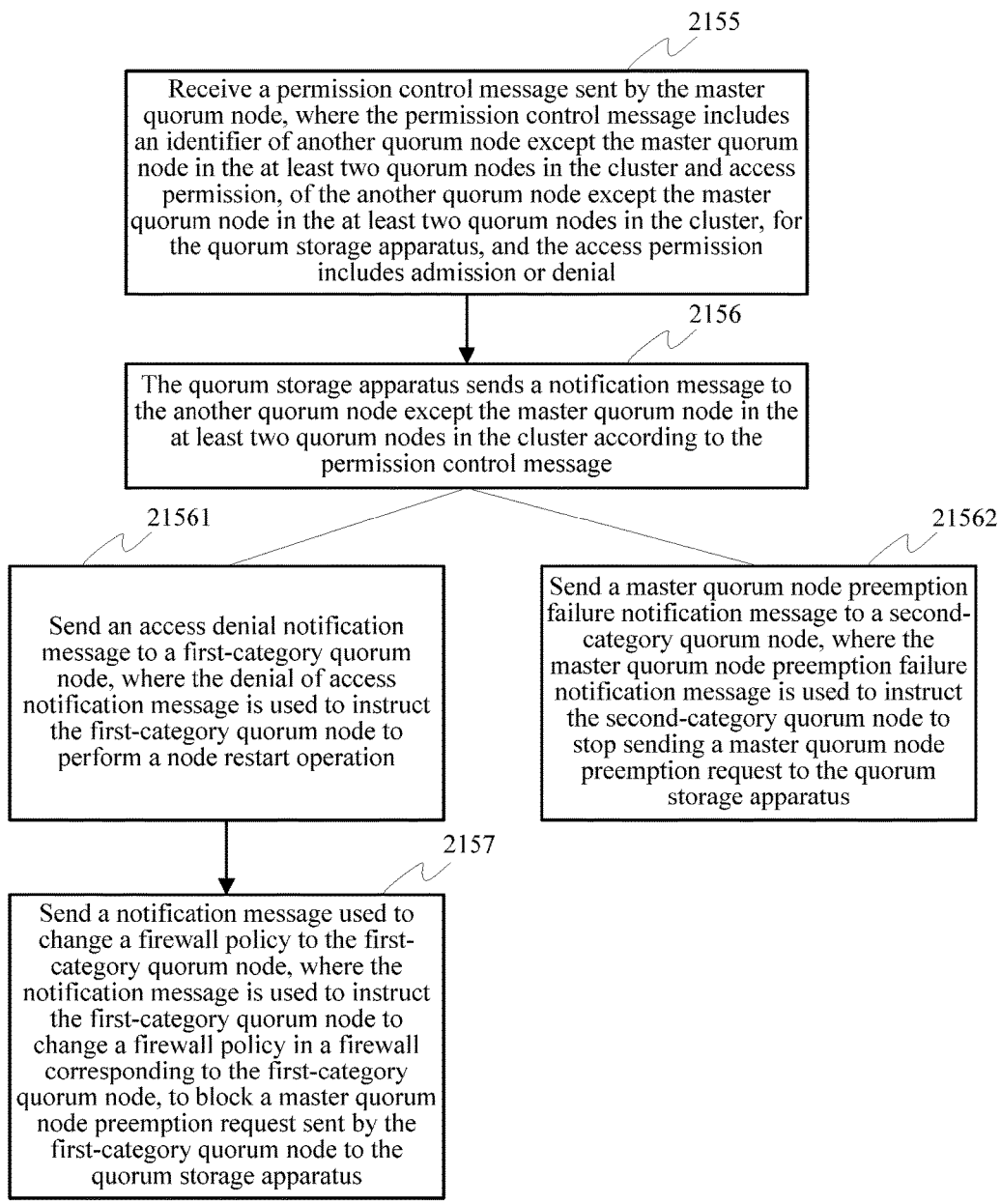

FIG. 2A to FIG. 2C show a first method embodiment in which a quorum storage apparatus implements brain split arbitration after brain split occurs in a cluster. The method embodiment is applied to a system, shown in FIG. 1, formed by the cluster and the quorum storage apparatus. Referring to FIG. 2A, the method includes:

201: The quorum storage apparatus pre-records an identifier of a master quorum node in a cluster.

In specific implementation, after the cluster is established, the quorum storage apparatus may set storage space on the quorum storage apparatus or a third-party storage device, to record the identifier of the master quorum node and a status of the master quorum node. In an initial state, the identifier of the master quorum node is recorded as null and the status of the master quorum node is recorded as null or faulty. Before the cluster starts operating normally, the master quorum node may be specified by means of initial setting by an administrator. After the cluster starts operating normally, the initially set master quorum node may send a refresh packet to the quorum storage apparatus periodically, where the refresh packet includes an identifier of the master quorum node and the identifier may be specifically an IP address, a number of the master quorum node in the cluster, or the like. The quorum storage apparatus may also set a refresh packet detection period, to detect whether the master quorum node sends a refresh packet. In a refresh packet detection period, the quorum storage apparatus performs the following processing according to different cases:

A: If a refresh packet is not received within a refresh packet detection period, a recorded status of the node is changed to faulty. If the refresh packet is not received within the refresh packet detection period, the quorum storage apparatus may consider that the master quorum node is faulty, and changes the status of the master quorum node in the record to faulty.

B: When the refresh packet sent by the master quorum node is received for the first time, the quorum storage apparatus may record an identifier of the master quorum node and change the status of the master quorum node in the record to "normal".

C: If it is not the first time to receive the refresh packet sent by the master quorum node, the following two cases are included:

C1: When it is detected that an identifier carried in the refresh packet is the same as the recorded identifier of the node and the recorded status of the master quorum node is normal, it indicates that the master quorum node in the current cluster is normal, and the quorum storage apparatus performs no operation on the recorded identifier.

C2: When it is detected that an identifier carried in the refresh packet is the same as the recorded identifier of the node, but the recorded status of the master quorum node is null or faulty, the quorum storage apparatus changes the status of the node in the record to normal. In this case, there may be two application scenarios. One scenario is cluster restart; in this case, all nodes are restarted, the original master quorum node cannot send a refresh packet within a refresh packet detection period after cluster restarting, and the recorded status of the master quorum node is changed to faulty. The other scenario is: if a refresh packet sent by the original quorum node is lost, and the quorum storage apparatus cannot receive a refresh packet within a detection period, the quorum storage apparatus changes the recorded status of the master quorum node to faulty.

203: After detecting a brain split occurs, each quorum node in each node group generates a master quorum node preemption request and sends the master quorum node preemption request to the quorum storage apparatus.

In specific implementation, one master quorum node preemption mechanism may be set on each quorum node, that is, after a quorum node detects that the brain split occurs, the quorum node may generate a master quorum node preemption request and send the master quorum node preemption request to the quorum storage apparatus. The master quorum node preemption request includes an identifier of the quorum node and the identifier of the quorum node may have multiple implementation manners, for example, an IP address (for example, 10.11.201.12) of the quorum node or a unique identifier (for example, a number 0010) of the quorum node in the cluster, or another implementation manner, which is not limited in this embodiment of the present disclosure.

It should be noted that after it is detected that brain split occurs, a quorum node generating and sending a master quorum node preemption request is a quorum node that currently survives, and those faulty (for example, shutdown) quorum nodes cannot generate or send master quorum node preemption requests. In specific implementation, quorum nodes sending master quorum node preemption requests may be all quorum nodes or may be some quorum nodes in the cluster.

In specific implementation, each quorum node may detect, by means of lease detection or heart beat detection, that the brain split occurs. It should be noted that lease detection and heart beat detection may also be used to detect connectivity between nodes.

(1) Lease-Based Detection Method

In this method, each node in the cluster may periodically apply to a lease manager for a lease. The lease manager maintains, for each node, a record of a lease owned by the node, where a time when the node acquires the lease is recorded. Each time the lease manager receives a lease request from each node, the lease manager updates the record, to reflect latest information of the lease acquired by the node. If the lease manager does not receive a lease prolongation request of a node within a specified period (Lease Duration), the lease manager may actively detect a status of the node (for example, detect, by means of Ping, whether the node is faulty or a network connection status of the node is faulty). If the lease manager does not detect the status of the node (for example, the node does not respond to a Ping data packet) continuously for multiple times, the lease manager considers that the node is faulty, and sends a notification indicating that the node is faulty to another node in the cluster. If the quorum node receives a notification indicating that all nodes in a node group are faulty, the quorum node may determine that the brain split occurs in the cluster.

(2) Heart Beat-Based Detection Method

In this method, in a system, nodes may form a heartbeat ring according to a topology structure, and by means of the heart beat ring, heart beat information may be sent between the nodes (a period of sending heart beat information generally is shorter than lease duration). When heart beat information of the nodes is aggregated, the heart beat information may be aggregated on quorum nodes in the cluster, and it is identified whether heart beat information of a node is lost. In order to avoid an incorrect determination, detection may be performed repeatedly for multiple times. If heart beat information of a node is not received for multiple times, it is determined that the node may be faulty (in this case, active detection may be performed to further determine whether the node is faulty), and a notification indicating that the node is faulty is sent to another node in the cluster. If the quorum node receives a notification indicating that all nodes in a node group are faulty, the quorum node may determine that the brain split occurs in the cluster.

205: The quorum storage apparatus receives, within a refresh packet detection period, the master quorum node preemption requests sent by the quorum nodes in the cluster, the quorum storage apparatus determines, according to the pre-recorded identifier of the master quorum node, whether the received master quorum node preemption requests include a master quorum node preemption request sent by the master quorum node corresponding to the identifier, and if yes, performs step 207, or if not, performs step 209.

In specific implementation, the master quorum node preemption requests received by the quorum storage apparatus may be master quorum node preemption requests sent by all quorum nodes in the cluster or may be master quorum node preemption requests sent by some quorum nodes in the cluster.

Whether the master quorum node preemption requests include the master quorum node preemption request of the recorded master quorum node is determined within the refresh packet detection period. The master quorum node preemption request carries an identifier of a quorum node sending the master quorum node preemption request. The quorum storage apparatus compares the pre-recorded identifier of the master quorum node with an identifier carried in each master quorum node preemption request. If the identifiers are the same, it indicates that the master quorum node preemption requests include the master quorum node preemption request of the master quorum node, and in this case, the quorum storage apparatus performs step 207. If it is found through comparison that the identifier carried in each master quorum node preemption request is different from the pre-stored identifier of the master quorum node, it indicates that the master quorum node preemption requests do not include the master quorum node preemption request of the master quorum node, and in this case, the quorum storage apparatus performs step 209.

207: When the received master quorum node preemption requests include the master quorum node preemption request sent by the master quorum node, the quorum storage apparatus maintains the pre-recorded identifier of the master quorum node, and performs step 213.

In specific implementation, within the refresh packet detection period, a processing policy that an original master quorum node takes priority is used in step 207. That is, within the refresh packet detection period of the quorum storage apparatus, if the master quorum node preemption request of the original master quorum node arrives at the quorum storage apparatus, the original master quorum node is preferentially used as a new master quorum node. Because in an actual application, the master quorum node is generally used as a management node in the cluster and undertakes a cluster management function, if the management node is frequently switched, service interruption may be caused, and switching of the management node may also cause backup and copy of service data and/or status data. In this way, great impact may be caused to processing resources of the cluster. Therefore, when the original master quorum node is preferentially used as the new master quorum node, the foregoing problem can be prevented effectively.

209: When the received master quorum node preemption requests do not include the master quorum node preemption request sent by the master quorum node, to respond, the quorum storage apparatus sends a response message to each quorum node sending the master quorum node preemption request, to instruct the quorum node to continue to send the master quorum node preemption request, and performs step 211.

It should be noted that, this step is not a mandatory step. In specific implementation, the quorum storage apparatus may not send a response message, but presets a master quorum node preemption request periodical sending mechanism on the quorum node. Before the quorum node receives a notification message sent by the quorum storage apparatus, each quorum node may periodically send the master quorum node preemption request.

Certainly, in order to improve the brain split arbitration efficiency, the quorum storage apparatus can send a response message to each quorum node, so that each quorum node can know brain split arbitration progress in time, and after master quorum node preemption succeeds, processing on invalid master quorum node preemption requests is reduced.

211: After the refresh packet detection period, each quorum node in the cluster continues to send a master quorum node preemption request to the quorum storage apparatus, the quorum storage apparatus changes the pre-recorded identifier of the master quorum node to an identifier of a quorum node corresponding to a master quorum node preemption request that is received first, and performs step 213.

In specific implementation, after the refresh packet detection period ends, the quorum storage apparatus determines a master quorum node in a manner of first come, first serve. That is, the quorum storage apparatus sets a quorum node corresponding to a master quorum node preemption request that is received first to a new master quorum node, so that the master quorum node can be determined rapidly, and a master node group after the brain split can be determined rapidly to continue normal works of the cluster.

A master quorum node preemption request that is received first refers to the first master quorum node preemption request that is received by the quorum storage apparatus and that arrives at the quorum storage apparatus after the refresh packet detection period. There may be two implementation possibilities. The first is: each quorum node already sends the master quorum node preemption request before the refresh packet detection period ends, and the master quorum node preemption request arrives at the quorum storage apparatus after the detection period. The second is: each quorum node sends the master quorum node preemption request after the refresh packet detection period ends, and the master quorum node preemption request arrives at the quorum storage apparatus after the detection period. This embodiment of the present disclosure does not limit either of the foregoing two possibilities.

213: The quorum storage apparatus sends a master quorum node preemption success response to a quorum node corresponding to the recorded identifier, where the master quorum node preemption success response is used to notify the quorum node that master quorum node preemption succeeds.

In specific implementation, the quorum node receiving the master quorum node preemption success response is selected as the master quorum node, and a node group in which the master quorum node is located is used as the master node group to continue works of the cluster.

215: The quorum storage apparatus sends a notification message to another quorum node except the master quorum node.

In specific implementation, for a quorum node having a connection type different from that of the master quorum node, a type of a notification message sent by the quorum storage apparatus is different. For a quorum node (that is, a quorum node that does not connect to the master quorum node) in a node group different from the node group in which the master quorum node is located, the quorum storage apparatus may send an access denial notification message, so that the quorum node is restarted and performs an operation of re-joining the cluster. For a quorum node (that is, a quorum node connecting to the master quorum node) in a node group that is the same as the node group in which the master quorum node is located, the quorum storage apparatus may send a master quorum node preemption failure notification message, so that the quorum node stops sending a master quorum node preemption request. The following two implementation manners exist:

Manner 1: A separate sending manner is used. Referring to FIG. 2B, the manner includes the following steps:

2151: The quorum storage apparatus receives a first permission control message sent by the recorded master quorum node, where the first permission control message includes an identifier of a first-category quorum node that does not connect to the determined master quorum node in the at least two quorum nodes included in the cluster.

In a specific implementation, the master quorum node detects connectivity between the master quorum node and another quorum node in the cluster by means of heart beat detection or lease detection, generates the first permission control message for the quorum node that does not connect to the master quorum node, and sends the first permission control message to the quorum storage apparatus.

The first-category quorum node refers to a quorum node that cannot physically or logically communicate with the master quorum node, that is, the first-category quorum node does not connect to the master quorum node. In an actual scenario, the first-category quorum node and the master quorum node are in different node groups.

2152: The quorum storage apparatus sends an access denial notification message to the first-category quorum node, where the access denial notification message is used to instruct the first-category quorum node to perform a node restart operation.

As an example, in specific implementation, the access denial notification message may use the following specific packet format (as shown in Table 1), and includes a node identifier and access permission for the quorum storage apparatus. For example, the identifier of the node is an IP address of the node, and actually may also have another representation manner, which is not limited in all embodiments of the present disclosure. After the quorum node receives the access denial notification message, the quorum node performs a node restart operation.

TABLE 1

| Node identifier | Access permission for the quorum storage apparatus |
|---|---|
| 10.11.207.198 | Denial |

Because the first-category quorum node is a quorum node that does not connect to the master quorum node, for example, physically, the two quorum nodes have no physical connection path, or logically, a switch between the two quorum nodes is faulty. During implementation, the first-category quorum node and the master quorum node are in different node groups. Because a node group in which the master quorum node is located is used as a master node group in brain split arbitration, the first-category quorum node belongs to another node group, and a quorum node in the node group needs to be restarted, and performs an operation of re-joining the cluster.

2153: The quorum storage apparatus receives a second permission control message sent by the master quorum node, where the second permission control message includes an identifier of a second-category quorum node that connects to the master quorum node in the at least two quorum nodes in the cluster.

In specific implementation, the master quorum node detects connectivity between the master quorum node and another quorum node by means of heart beat detection or lease detection, generates the second permission control message, and sends the second permission control message to the quorum storage apparatus.

The second-category quorum node refers to a quorum node that can communicate with the master quorum node, that is, the second-category quorum node connects to the master quorum node. In an actual scenario, the second-category quorum node and the master quorum node are in a same node group.

2154: The quorum storage apparatus sends a master quorum node preemption failure notification message to the second-category quorum node, where the master quorum node preemption failure notification message is used to instruct the second-category quorum node to stop sending a master quorum node preemption request to the quorum storage apparatus.

As an example, in specific implementation, the master quorum node preemption failure notification message uses the following specific packet format (as shown in Table 2). The packet format includes a node identifier and permission of sending a master quorum node preemption request. For example, the identifier of the node is an IP address of the node, and actually may also have another representation manner, which is not limited in embodiments of the present disclosure. After the quorum node receives the master quorum node preemption failure notification message, the quorum node stops sending a master quorum node preemption request to the quorum storage apparatus.

TABLE 2

| Node identifier | Permission of sending a master quorum node preemption request |
|---|---|
| 10.11.207.196 | Denial |

For manner 1, in a specific implementation manner, an execution sequence between steps 2151 and 2152 and steps 2153 and 2154 is not limited. Step 2151 to step 2154 may be executed according to a sequence from step 2151 to step 2154, or steps 2153 and 2154 may be executed first and steps 2151 and 2152 are executed then, which is not limited in this embodiment of the present disclosure.

Manner 2: An integrated sending manner is used.

A difference from manner 1 lies in that: the master quorum node generates a permission control message, where the message includes an identifier of another quorum node except the master quorum node and access permission of the quorum node for the quorum storage apparatus. The access permission includes admission or denial. The master quorum node sends the permission control message to the quorum storage apparatus. The quorum storage apparatus separately generates, according to the identifier and access permission corresponding to the identifier, an access denial notification message for the first-category quorum node and a master quorum node preemption failure notification message for the second-category quorum node, where the first-category quorum node is a quorum node that does not connect to the master quorum node and the second-category quorum node is a quorum node that connects to the master quorum node. It is determined by means of heart beat detection or lease detection whether two quorum nodes connect to each other. After receiving the access denial notification message, the first-category quorum node may perform operations of node restart and re-joining the cluster. After receiving the master quorum node preemption failure notification message, the second-category quorum node may stop sending a master quorum node preemption request to the quorum storage apparatus.

The following steps may be specifically included. Referring to FIG. 2C, the manner includes the following steps:

2155: The quorum storage apparatus receives a permission control message sent by the master quorum node, where the permission control message includes an identifier of another quorum node except the master quorum node in the at least two quorum nodes in the cluster and access permission, of the another quorum node except the master quorum node in the at least two quorum nodes in the cluster, for the quorum storage apparatus, and the access permission includes admission or denial.

As an example, the master quorum node generates the permission control message, where the permission control message uses the format shown in Table 3.

TABLE 3

| Node identifier | Access permission of a node for the quorum storage apparatus |
|---|---|
| 10.11.207.196 | Admission |
| 10.11.207.198 | Denial |

The master quorum node sends the permission control message to the quorum storage apparatus.

2156: The quorum storage apparatus sends a notification message to the another quorum node except the master quorum node in the at least two quorum nodes in the cluster according to the permission control message.

21561: For the first-category quorum node whose access permission is denial, the quorum storage apparatus sends the access denial notification message to the first-category quorum node, where the access denial notification message is used to instruct the first-category quorum node to perform a node restart operation.

In specific implementation, the packet format shown in Table 1 in step 2052 may be used. Others are similar, and details are not described herein.

The first-category quorum node refers to a quorum node that cannot physically or logically communicate with the master quorum node, that is, the first-category quorum node does not connect to the master quorum node. In an actual scenario, the first-category quorum node and the master quorum node are in different node groups.

21562: For the second-category quorum node whose access permission is admission, the quorum storage apparatus sends the master quorum node preemption failure notification message to the second-category quorum node, where the master quorum node preemption failure notification message is used to instruct the second-category quorum node to stop sending a master quorum node preemption request to the quorum storage apparatus.

In specific implementation, the packet format shown in Table 2 in step 2054 may be used. Others are similar, and details are not described herein.

The second-category quorum node refers to a quorum node that can communicate with the master quorum node, that is, the second-category quorum node connects to the master quorum node. In an actual scenario, the second-category quorum node and the master quorum node are in a same node group.

By means of the foregoing two implementation manners, another quorum node except the master quorum node in the cluster can perform corresponding processing according to the message sent by the quorum storage apparatus. Specifically, a quorum node (a quorum node in another node group after brain split) that does not connect to the master quorum node may perform a restart operation. A quorum node (a quorum node in a master node group after brain split) that connects to the master quorum node stops sending a master quorum node preemption request. By means of the foregoing processing, after the master quorum node is determined, the other quorum nodes can recover rapidly from master quorum node preemption after the brain split, so that rapid recovery of a normal service of the cluster can be implemented effectively.

2157: After sending the access denial notification message to the first-category quorum node, the quorum storage apparatus also sends a notification message used to change a firewall policy to the first-category quorum node, where the notification message is used to instruct the first-category quorum node to change a firewall policy in a firewall corresponding to the first-category quorum node, to block a master quorum node preemption request sent by the first-category quorum node to the quorum storage apparatus.

In specific implementation, for a quorum node in a node group different from that of the master quorum node, that is, the first-category quorum node, in order to avoid that the quorum node continues to send a master quorum node preemption request to the quorum storage apparatus, the quorum storage apparatus sends the notification message used to change a firewall policy to the quorum node. After receiving the notification message, the quorum node may change the firewall policy in the firewall corresponding to the quorum node, to block the master quorum node preemption request sent by the quorum node to the quorum storage apparatus.

It should be noted that, before the first-category quorum node is restarted, the first-category quorum node further sends a master quorum node preemption request to the quorum storage apparatus. Setting of the step can effectively block the master quorum node preemption request sent by the quorum node, and avoid that the quorum storage apparatus wastes processing capabilities on the invalid master quorum node preemption request.

The foregoing solution can effectively resolve a problem in the prior art that after the brain split occurs in the cluster, a master node group cannot be determined through arbitration.

After arbitration processing after the cluster brain split ends, another node except the quorum node in the cluster may determine, by means of heart beat detection or lease detection, connectivity between the node and the master quorum node. When it is determined that the node connects to the master quorum node, it indicates that the node and the master quorum node are in a same node group, and the node continues to work. When it is determined that the node does not connect to the master quorum node, it indicates that the node and the master quorum node are in different node groups, the node triggers restarting and performs a process of re-joining the node group in which the master quorum node is located.

Figure 3:
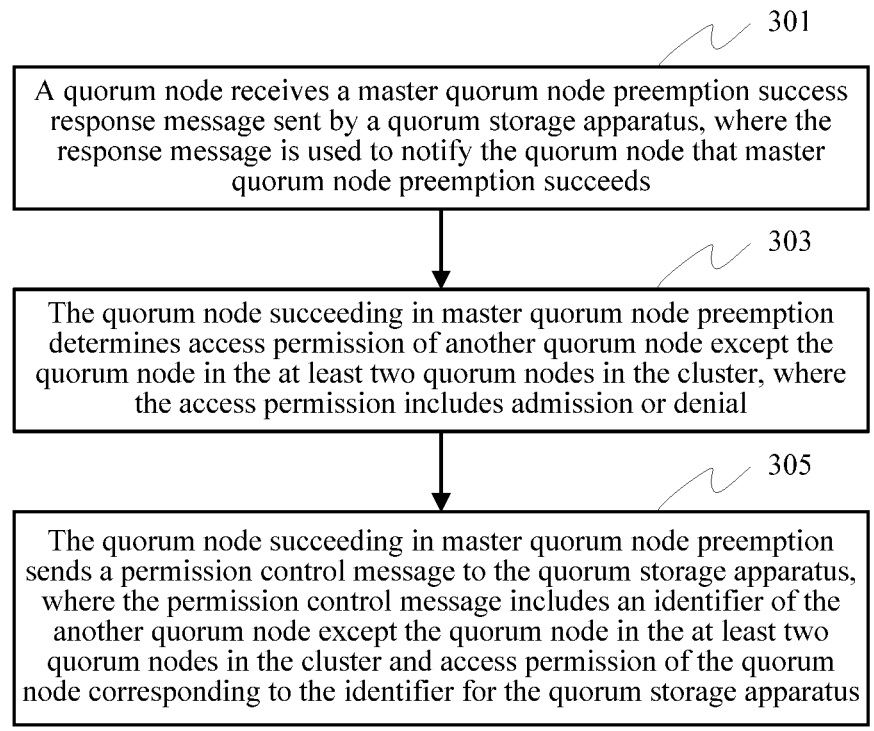
FIG. 3 is a schematic diagram of a second embodiment of an arbitration processing method after brain split according to the present disclosure.

Correspondingly, the present disclosure further provides a second embodiment of an arbitration method after cluster brain split. For a quorum node succeeding in master quorum node preemption, a processing process includes the following steps (as shown in FIG. 3):

301: The quorum node receives a master quorum node preemption success response message sent by the quorum storage apparatus, where the master quorum node preemption success response message is used to notify the quorum node that master quorum node preemption succeeds.

303: The quorum node succeeding in master quorum node preemption determines access permission of another quorum node except the quorum node in the at least two quorum nodes in the cluster, where the access permission includes admission or denial.

305: The quorum node succeeding in master quorum node preemption sends a permission control message to the quorum storage apparatus, where the permission control message includes an identifier of the another quorum node except the quorum node in the at least two quorum nodes in the cluster and access permission of the quorum node corresponding to the identifier for the quorum storage apparatus.

For a processing process of the foregoing embodiment, refer to descriptions of step 205 in the previous embodiment, and details are not described herein.

Device Embodiments of the Present Disclosure

Figure 4:
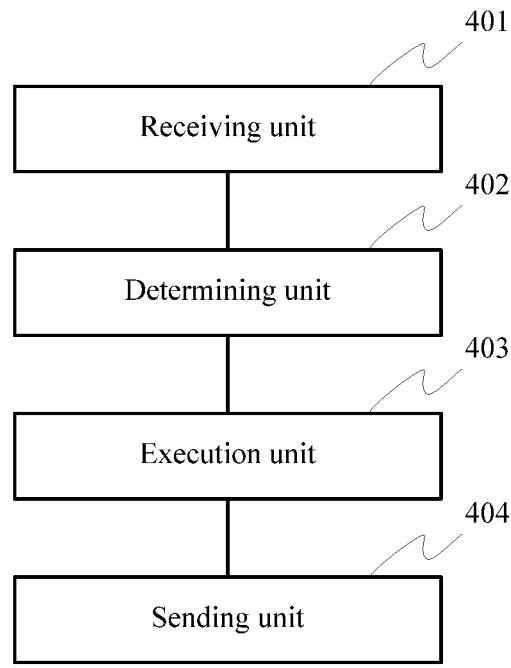
FIG. 4 is a schematic block diagram of a first embodiment of a quorum storage apparatus according to the present disclosure.

Referring to FIG. 4, the present disclosure further provides a quorum storage apparatus 400 used for arbitration processing in a cluster, applied to a system formed by the cluster and the quorum storage apparatus 400. The cluster includes at least two quorum nodes, the quorum storage apparatus 400 pre-records an identifier of a master quorum node in the cluster, and the master quorum node is one of the at least two quorum nodes. The quorum storage apparatus 400 includes:

a receiving unit 401, configured to receive, within a detection period, master quorum node preemption requests sent by the quorum nodes in the cluster, where each master quorum node preemption request includes an identifier of a quorum node;

a determining unit 402 is configured to determine, according to the identifier of the master quorum node, whether the master quorum node preemption requests received by the receiving unit 401 include a master quorum node preemption request sent by the master quorum node;

an execution unit 403, configured to: when the received master quorum node preemption requests include the master quorum node preemption request sent by the master quorum node, maintain the recorded identifier of the node; or when the received master quorum node preemption requests do not include the master quorum node preemption request sent by the master quorum node, after a first refresh packet detection period, change the recorded identifier to an identifier of a quorum node corresponding to a master quorum node preemption request that arrives at the quorum storage apparatus first; and a sending unit 404, configured to send a master quorum node preemption success response message to the quorum node corresponding to the recorded identifier, where the response message is used to notify the quorum node corresponding to the recorded identifier that master quorum node preemption succeeds.

Further, in the quorum storage apparatus 400, the execution unit 403 is further configured to: when the received master quorum node preemption requests do not include the master quorum node preemption request sent by the master quorum node, generate a response message, where the response message is used to instruct the quorum node sending the master quorum node preemption request to continue to send the master quorum node preemption request, and trigger the sending unit 404; and the sending unit 404 is further configured to send the response message to the quorum node sending the master quorum node preemption request.

Further, in the quorum storage apparatus 400, the receiving unit 401 is further configured to: after the sending unit 404 sends a master quorum node preemption success response message to the quorum node corresponding to the recorded identifier, receive a first permission control message sent by the quorum node corresponding to the recorded identifier, where the first permission control message includes an identifier of a first-category quorum node that does not connect to the quorum node corresponding to the recorded identifier in the at least two quorum nodes included in the cluster;

the execution unit 403 is further configured to generate an access denial notification message according to the first permission control message and trigger the sending unit 404, where the access denial notification message is used to instruct the first-category quorum node to perform a node restart operation; and the sending unit 404 is further configured to send the access denial notification message to the first-category quorum node.

Further, in the quorum storage apparatus 400, the receiving unit 401 is further configured to: after the sending unit 404 sends a master quorum node preemption success response message to the quorum node corresponding to the recorded identifier, receive a second permission control message sent by the quorum node corresponding to the recorded identifier, where the second permission control message includes an identifier of a second-category quorum node that connects to the quorum node corresponding to the recorded identifier in the at least two quorum nodes in the cluster;

the execution unit 403 is further configured to generate a master quorum node preemption failure notification message according to the second permission control message and trigger the sending unit 404, where the master quorum node preemption failure notification message is used to instruct the second-category quorum node to stop sending a master quorum node preemption request to the quorum storage apparatus 400; and the sending unit 404 is further configured to send the master quorum node preemption failure notification message to the second-category quorum node.

Further, in the quorum storage apparatus 400, the receiving unit 401 is further configured to: after the sending unit 404 sends a master quorum node preemption success response message to the quorum node corresponding to the recorded identifier, receive a permission control message sent by the quorum node corresponding to the recorded identifier, where the permission control message includes an identifier of another quorum node except the quorum node corresponding to the recorded identifier in the at least two quorum nodes in the cluster and access permission, of the another quorum node except the quorum node corresponding to the recorded identifier in the at least two quorum nodes, for the quorum storage apparatus 400, and the access permission includes admission or denial;

the execution unit 403 is further configured to generate a notification message according to the permission control message, and trigger the sending unit 404; and the sending unit 404 is further configured to send the notification message to the another quorum node except the quorum node corresponding to the recorded identifier in the at least two quorum nodes.

Further, in the quorum storage apparatus 400, the execution unit 403 is, in some embodiments, configured to generate an access denial notification message for the first-category quorum node whose access permission is denial, where the access denial notification message is used to instruct the first-category quorum node to perform a node restart operation; and the sending unit 404 is, in some embodiments, configured to send the access denial notification message to the first-category quorum node.

Further, in the quorum storage apparatus 400, the execution unit 403 is, in some embodiments, configured to generate a master quorum node preemption failure notification message for the second-category quorum node whose access permission is admission, where the master quorum node preemption failure notification message is used to instruct the second-category quorum node to stop sending a master quorum node preemption request to the quorum storage apparatus 400; and the sending unit 404 is, in some embodiments, configured to send the master quorum node preemption failure notification message to the second-category quorum node.

Further in the quorum storage apparatus 400, the execution unit 403 is further configured to: after the sending 404 unit sends the access denial notification message to the first-category quorum node, generate, for the first-category quorum node, a notification message used to change a firewall policy, where the notification message used to change a firewall policy is used to instruct the first-category quorum node to change a firewall policy corresponding to a firewall of the first-category quorum node, to block a master quorum node preemption request sent by the first-category quorum node to the quorum storage apparatus 400; and the sending unit 404 is further configured to send the notification message used to change a firewall policy to the first-category quorum node.

Figure 5:
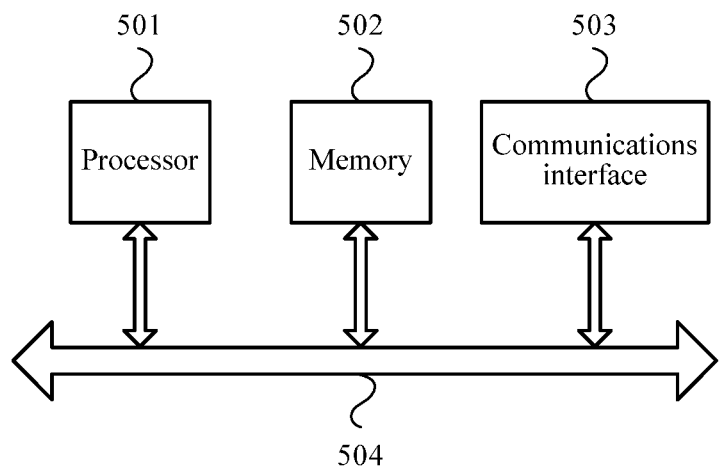
FIG. 5 is a schematic block diagram of a second embodiment of a quorum storage apparatus according to the present disclosure.

Referring to FIG. 5, the present disclosure further provides a second embodiment of a quorum storage apparatus. The quorum storage apparatus 500 includes:

a processor 501, a memory 502, a communications interface 503, and a bus 504, where the processor 501, the memory 502, and the communications interface 503 communicate with each other by using the bus 504;

the communications interface 503 is configured to communicate with at least two quorum nodes in a cluster;

the memory 502 is configured to store a program; and when the quorum storage apparatus 500 runs, the processor 501 is configured to execute the program stored in the memory 502, to execute the method process of the first embodiment of the brain split arbitration method.

Figure 6:
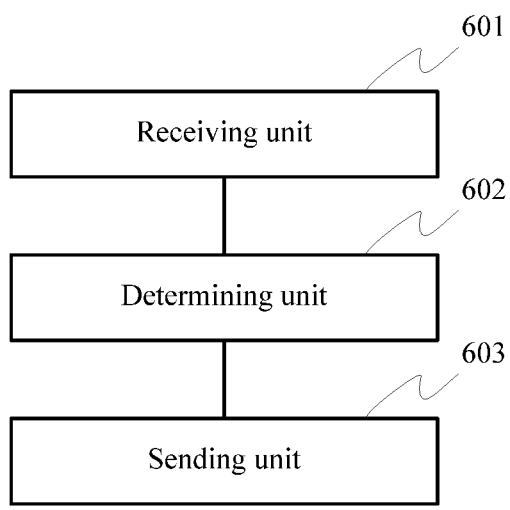
FIG. 6 is a schematic block diagram of a first embodiment of a node according to the present disclosure.

Referring to FIG. 6, the present disclosure further provides a first embodiment of a quorum node. The quorum node 600 includes:

a receiving unit 601, configured to receive a master quorum node preemption success response message sent by a quorum storage apparatus, where the response message is used to notify the node that master quorum node preemption succeeds;

a determining unit 602, configured to determine access permission of another quorum node except the quorum node

600 in at least two quorum nodes in a cluster, where the access permission includes admission or denial; and a sending unit 603, configured to send a permission control message to the quorum storage apparatus, where the permission control message includes an identifier of the another quorum node except the quorum node 600 in the at least two quorum nodes in the cluster and access permission of the quorum node corresponding to the identifier for the quorum storage apparatus.

Figure 7:
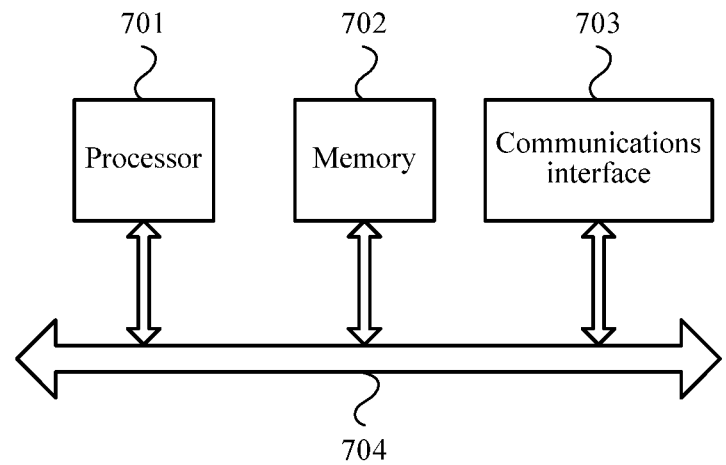
FIG. 7 is a schematic block diagram of a second embodiment of a node according to the present disclosure.

Referring to FIG. 7, the present disclosure further provides a second embodiment of a quorum node. The quorum node 700 includes:

a processor 701, a memory 702, a communications interface 703, and a bus 704, where the processor 701, the memory 702, and the communications interface 703 communicate with each other by using the bus 704;

the communications interface 703 is configured to communication with another quorum node and the quorum storage apparatus in a cluster;

the memory 702 is configured to store a program; and when the quorum node 700 runs, the processor 701 is configured to execute the program stored in the memory 702, to execute the method process of the second embodiment of the brain split arbitration method.

Figure 8:
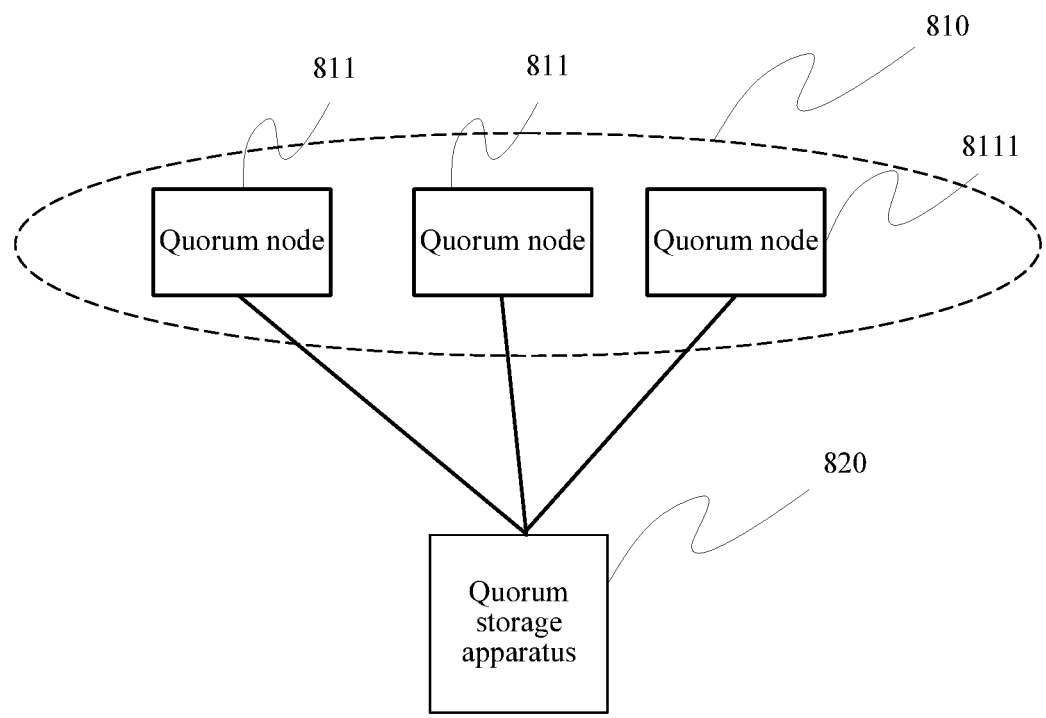
FIG. 8 is a schematic block diagram of an embodiment of an arbitration processing system after brain split according to the present disclosure.

Referring to FIG. 8, the present disclosure further provides an arbitration processing system after cluster brain split. The system 800 includes:

a cluster 810 and a quorum storage apparatus 820 shown in the first embodiment or the second embodiment of the arbitration apparatus, where the cluster 810 includes at least two quorum nodes 811, the at least two quorum nodes include a master quorum node 8111, and the quorum storage apparatus 820 pre-records an identifier of the master quorum node 8111 in the cluster.

Third Method Embodiment of the Present Disclosure

Figure 9:
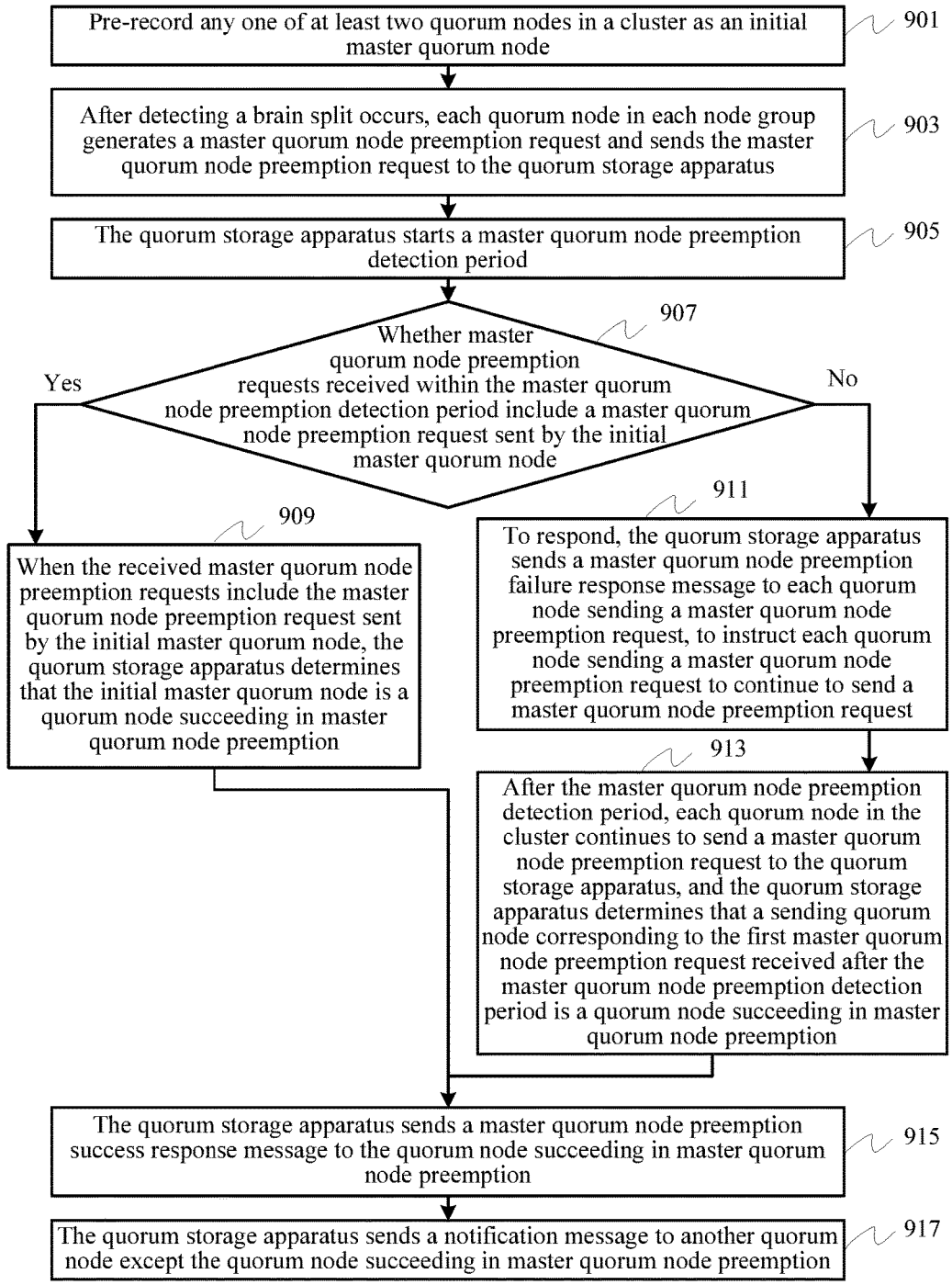
FIG. 9 is a schematic diagram of a third embodiment of an arbitration processing method after brain split according to the present disclosure.

FIG. 9 shows a third method embodiment in which a quorum storage apparatus implements brain split arbitration after brain split occurs in a cluster. The method embodiment is applied to a system, shown in FIG. 1, formed by the cluster and the quorum storage apparatus. The cluster includes at least two quorum nodes. Referring to FIG. 9, the method includes:

901: Pre-record one of the at least two quorum nodes in the cluster as an initial master quorum node.

A specific implementation process of this step is similar to an implementation process of step 201 in the first method embodiment, and details are not described herein.

903: After detecting a brain split occurs, each quorum node in each node group generates a master quorum node preemption request and sends the master quorum node preemption request to the quorum storage apparatus.

A specific implementation of this step is similar to step 203 in the first method embodiment, and details are not described herein.

905: The quorum storage apparatus starts a master quorum node preemption detection period, and performs step 907.

The master quorum node preemption detection period may be a time period set by the quorum storage apparatus, or may be set by a third-party device.

In specific implementation, an execution sequence of step 903 and step 905 is described by using two implementation manners.

Implementation manner 1: After receiving the first master quorum node preemption request, the quorum storage apparatus immediately starts the master quorum node preemption detection period, where the first master quorum node preemption request is the first master quorum node preemption request received by the quorum storage apparatus after the brain split occurs.

Implementation manner 2: After receiving a specified quantity (one or more) of master quorum node preemption requests, the quorum storage apparatus determines whether quorum nodes sending the specified quantity of master quorum node preemption requests include the initial master quorum node, and if not, the quorum storage apparatus sends a master quorum node preemption failure response message to each of the quorum nodes sending the specified quantity of master quorum node preemption requests and starts the master quorum node preemption detection period; or if yes, the quorum storage apparatus sets the initial master quorum node as a quorum node succeeding in master quorum node preemption.

It should be noted that, as further extension of implementation manner 1, in another preferable implementation manner, after the quorum storage apparatus receives the first master quorum node preemption request, before the quorum storage apparatus starts the master quorum node preemption detection period, the method further includes: if the quorum storage apparatus determines that a quorum node sending the first master quorum node preemption request is the initial master quorum node, setting the initial master quorum node as a quorum node succeeding in master quorum node preemption, and sending a master quorum node success response message to the quorum node succeeding in master quorum node preemption.

907: The quorum storage apparatus determines whether master quorum node preemption requests received within the master quorum node preemption detection period include a master quorum node preemption request sent by the initial master quorum node, and if yes, performs step 909, or if not, performs step 911.

In specific implementation, the quorum storage apparatus compares a pre-stored identifier of the initial master quorum node with identifiers in the received master quorum node preemption requests, to determine whether the received master quorum node preemption requests include the master quorum node preemption request sent by the initial master quorum node.

In a specific implementation process, there may be two implementation manners in which the quorum storage apparatus determines whether the master quorum node preemption requests received within the master quorum node preemption detection period include the master quorum node preemption request sent by the initial master quorum node:

Manner 1: The quorum storage apparatus caches all master quorum node preemption requests received within the master quorum node preemption detection period, and the quorum storage apparatus determines whether quorum nodes sending all the cached master quorum node preemption requests include the initial master quorum node.

It should be noted that the quorum storage apparatus has a storage apparatus, to cache identifiers of the quorum nodes sending the master quorum node preemption requests, and the quorum storage apparatus compares the identifier of the initial master quorum node with the identifiers of the quorum nodes sending the master quorum node preemption requests to determine whether the initial master quorum node is included.

Manner 2: The quorum storage apparatus sequentially determines whether a quorum node sending each master quorum node preemption request received within the master quorum node preemption detection period is the initial master quorum node.

In specific implementation, the master quorum node preemption requests received by the quorum storage apparatus may be master quorum node preemption requests sent by all quorum nodes in the cluster or may be master quorum node preemption requests sent by some quorum nodes in the cluster.

The master quorum node preemption request carries an identifier of a quorum node sending the master quorum node preemption request. The quorum storage apparatus compares the identifier of the initial master quorum node with an identifier carried in each master quorum node preemption request. If the identifiers are the same, it indicates that the master quorum node preemption requests include the master quorum node preemption request of the initial master quorum node, and in this case, the quorum storage apparatus performs step 909. If it is found through comparison that the identifier carried in each master quorum node preemption request is different from the identifier of the initial master quorum node, it indicates that the master quorum node preemption requests do not include the master quorum node preemption request of the initial master quorum node, and in this case, the quorum storage apparatus performs step 911.

909: When the received master quorum node preemption requests include the master quorum node preemption request sent by the initial master quorum node, the quorum storage apparatus determines that the initial master quorum node is a quorum node succeeding in master quorum node preemption, and performs step 915.

In specific implementation, it is determined that the initial master quorum node is the quorum node succeeding in master quorum node preemption, that is, the pre-recorded identifier of the initial master quorum node remains unchanged.

Within the master quorum node preemption detection period, a processing policy that the initial master quorum node takes a priority is used in step 909. That is, within the master quorum node preemption detection period of the quorum storage apparatus, if the master quorum node preemption request of the initial master quorum node arrives at the quorum storage apparatus, the initial master quorum node is preferentially used as the quorum node succeeding in master quorum node preemption, that is, a new master quorum node. Because in an actual application, the master quorum node is generally used as a management node in the cluster and undertakes a cluster management function, if the management node is frequently switched, service interruption may be caused, and switching of the management node may also cause backup and copy of service data and/or status data. In this way, great impact may be caused to processing resources of the cluster. Therefore, when the initial master quorum node is preferentially used as the new master quorum node, the foregoing problem can be prevented effectively.

911: When the received master quorum node preemption requests do not include the master quorum node preemption request sent by the initial master quorum node, to respond, the quorum storage apparatus sends a master quorum node preemption failure response message to each quorum node sending a master quorum node preemption request, to instruct each quorum node sending a master quorum node preemption request to continue to send a master quorum node preemption request, and performs step 913.

In specific implementation, for step 907, there are two implementation manners in which the quorum storage apparatus determines whether the master quorum node preemption request sent by the initial master quorum node is received within the master quorum node preemption detection period. Herein, there are also two manners in which the quorum storage apparatus sends the master quorum node preemption failure response message to each quorum node sending a master quorum node preemption request.

Manner 1: The quorum storage apparatus sends the master quorum node preemption failure response message to each of quorum nodes sending all cached master quorum node preemption requests, so that the quorum nodes sending all the cached master quorum node preemption requests send new master quorum node preemption requests to the quorum storage apparatus again.

Manner 2: The quorum storage apparatus sends the master quorum node preemption failure response message to a quorum node sending each master quorum node preemption request received within the master quorum node preemption detection period, so that the quorum node sending each master quorum node preemption request received within the master quorum node preemption detection period sends a new master quorum node preemption request to the quorum storage apparatus again.

It should be noted that, this step is not a mandatory step. In specific implementation, the quorum storage apparatus may not send a response message, but presets a master quorum node preemption request periodical sending mechanism on the quorum node. Before the quorum node receives a notification message sent by the quorum storage apparatus, each quorum node may periodically send the master quorum node preemption request.

Certainly, in order to improve the brain split arbitration efficiency, the quorum storage apparatus sends a response message to each quorum node, so that each quorum node can know brain split arbitration progress in time, and after master quorum node preemption succeeds, processing on invalid master quorum node preemption requests is reduced.

913: After the master quorum node preemption detection period, each quorum node in the cluster continues to send a master quorum node preemption request to the quorum storage apparatus, the quorum storage apparatus determines that a quorum node sending the corresponding first master quorum node preemption request received after the master quorum node preemption detection period is a quorum node succeeding in master quorum node preemption, and performs step 915.

In specific implementation, the quorum storage apparatus changes the identifier of the initial master quorum node to an identifier of the quorum node corresponding to the first master quorum node preemption request received after the master quorum node preemption detection period.

After the master quorum node preemption detection period ends, the quorum storage apparatus determines a master quorum node in a manner of "first come first service". That is, the quorum storage apparatus sets a quorum node corresponding to the first master quorum node preemption request received after the master quorum node preemption detection period ends as a new master quorum node, so that the quorum node succeeding in master quorum node preemption can be determined rapidly, and a master node group after the brain split can be determined rapidly to continue normal works of the cluster.

For the first master quorum node preemption request received after the master quorum node preemption detection period ends, there may be two implementation manners. The first is: each quorum node already sends the master quorum node preemption request before the master quorum node preemption detection period ends, and the master quorum node preemption request arrives at the quorum storage apparatus after the detection period. The second is: each quorum node sends the master quorum node preemption request after the master quorum node preemption detection period ends, and the master quorum node preemption request arrives at the quorum storage apparatus after the master quorum node preemption detection period ends. This embodiment of the present disclosure does not limit either of the foregoing two possibilities.

915: The quorum storage apparatus sends a master quorum node preemption success response message to the quorum node succeeding in master quorum node preemption.

In specific implementation, the quorum node receiving the master quorum node preemption success response is selected as the master quorum node, and a node group in which the master quorum node is located is used as the master node group to continue works of the cluster.

917: The quorum storage apparatus sends a notification message to another quorum node except the quorum node succeeding in master quorum node preemption.

In specific implementation, for a quorum node having a connection type different from that of the quorum node succeeding in master quorum node preemption, a type of a notification message sent by the quorum storage apparatus is different. For a quorum node (that is, a quorum node that does not connect to the quorum node succeeding in master quorum node preemption) in a node group different from the node group in which the quorum node succeeding in master quorum node preemption is located, the quorum storage apparatus may send an access denial notification message, so that the quorum node is restarted and performs an operation of re-joining the cluster. For a quorum node (that is, a quorum node connecting to the quorum node succeeding in master quorum node preemption) in a node group that is the same as the node group in which the quorum node succeeding in master quorum node preemption is located, the quorum storage apparatus may send a master quorum node preemption failure notification message, so that the quorum node stops sending a master quorum node preemption request.

The following two implementation manners exist. Manner 1: A separate sending manner (similar to an implementation manner described in FIG. 2B and corresponding texts in the first method embodiment) is used. Manner 2: An integrated sending manner (similar to an implementation manner described in FIG. 2C and corresponding texts in the first method embodiment) is used. Details are not described herein.

In specific implementation, for a quorum node in a node group different from that of the quorum node succeeding in master quorum node preemption, that is, a first-category quorum node, in order to avoid that the quorum node continues to send a master quorum node preemption request to the quorum storage apparatus, the quorum storage apparatus sends a notification message used to change a firewall policy to the quorum node. After receiving the notification message, the quorum node may change a firewall policy in a firewall corresponding to the quorum node, to block the master quorum node preemption request sent by the quorum node to the quorum storage apparatus.

It should be noted that, after the first-category quorum node performs a restart operation and rejoins the cluster, the method embodiment further includes: sending, by the quorum storage apparatus, a notification message used to change a firewall policy to admission to the first-category quorum node, where the notification message used to change a firewall policy to admission is used to instruct the first-category quorum node to change the firewall policy in the firewall of the first-category quorum node to admission, to allow the first-category quorum node to send a master quorum node preemption request to the quorum storage apparatus.

It should be noted that, before the first-category quorum node is restarted, the first-category quorum node further sends a master quorum node preemption request to the quorum storage apparatus. Setting of the step can effectively block the master quorum node preemption request sent by the quorum node, and avoid that the quorum storage apparatus wastes processing capabilities on the invalid master quorum node preemption request.

The foregoing solution can effectively resolve a problem in the prior art that after the brain split occurs in the cluster, a master node group cannot be determined through arbitration.

After arbitration processing after the cluster brain split ends, another node except the quorum node in the cluster may determine, by means of heart beat detection or lease detection, connectivity between the node and the quorum node succeeding in master quorum node preemption. When it is determined that the node connects to the quorum node succeeding in master quorum node preemption, it indicates that the node and the quorum node succeeding in master quorum node preemption are in a same node group, and the node continues to work. When it is determined that the node does not connect to the quorum node succeeding in master quorum node preemption, it indicates that the node and the quorum node succeeding in master quorum node preemption are in different node groups, the node triggers restarting and performs a process of re-joining the node group in which the quorum node succeeding in master quorum node preemption is located.

Third Device Embodiment of the Present Disclosure

Figure 10:
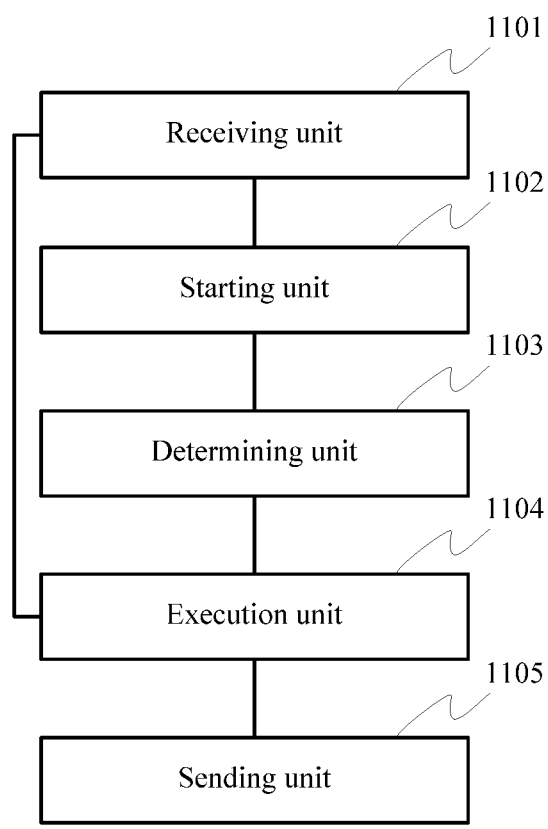
FIG. 10 is a schematic block diagram of a third embodiment of a quorum storage apparatus according to the present disclosure.

Referring to FIG. 10, the present disclosure further provides a third embodiment of a quorum storage apparatus used for arbitration processing in a cluster, applied to a system formed by the cluster and a quorum storage apparatus. The cluster includes at least two quorum nodes, the quorum storage apparatus 1100 pre-configures one of the at least two quorum nodes in the cluster to an initial master quorum node. The quorum storage apparatus includes:

a receiving unit 1101, configured to: after brain split occurs in the cluster, receive master quorum node preemption requests of the at least two quorum nodes;

a starting unit 1102, configured to start a master quorum node preemption detection period;

a determining unit 1103, configured to determine whether a master quorum node preemption request sent by the initial master quorum node is received within the master quorum node preemption detection period;

an execution unit 1104, configured to: when the master quorum node preemption request sent by the initial master quorum node is received within the master quorum node preemption detection period, set the initial master quorum node as a quorum node succeeding in master quorum node preemption; and a sending unit 1105, configured to send a master quorum node preemption success response message to the quorum node succeeding in master quorum node preemption.

Specifically, two implementation manners are provided.

Implementation manner 1: After receiving the first master quorum node preemption request, the quorum storage apparatus immediately starts the master quorum node preemption detection period, where the first master quorum node preemption request is the first master quorum node preemption request received by the quorum storage apparatus after the brain split occurs.

Implementation manner 2: After receiving a specified quantity (one or more) of master quorum node preemption requests, the quorum storage apparatus determines whether quorum nodes sending the specified quantity of master quorum node preemption requests include the initial master quorum node, and if not, the quorum storage apparatus sends the master quorum node preemption failure response message to each of the quorum nodes sending the specified quantity of master quorum node preemption requests and starts the master quorum node preemption detection period; or if yes, the quorum storage apparatus sets the initial master quorum node as a quorum node succeeding in master quorum node preemption.

Further, in the quorum storage apparatus, the execution unit 1104 is further configured to: when it is determined that the master quorum node preemption request sent by the initial master quorum node is not received within the master quorum node preemption detection period, set a quorum node sending the first master quorum node preemption request received after the master quorum node preemption detection period ends as a quorum node succeeding in master quorum node preemption; and the sending unit 1105 is further configured to send a master quorum node preemption success response message to the quorum node succeeding in master quorum node preemption.

Further, the determining unit 1103 is, in some embodiments, configured to cache all master quorum node preemption requests received within the master quorum node preemption detection period, and determine whether quorum nodes sending all the cached master quorum node preemption requests include the initial master quorum node; or within the master quorum node preemption detection period, sequentially determine whether a quorum node sending each master quorum node preemption request received within the master quorum node preemption detection period is the initial master quorum node.

Further, the execution unit 1104 is further configured to: after the determining unit 1003 determines that the quorum nodes sending all the cached master quorum node preemption requests do not include the initial master quorum node, generate a master quorum node preemption failure response message; and the sending unit 1105 is further configured to send the master quorum node preemption failure response message to each of the quorum nodes sending all the cached master quorum node preemption requests, so that the quorum nodes sending all the cached master quorum node preemption requests send new master quorum node preemption requests to the quorum storage apparatus again.

Further, the execution unit 1104 is further configured to: after the determining unit 1103 determines that the quorum nodes sending all the cached master quorum node preemption requests do not include the initial master quorum node, generate a master quorum node preemption failure response message; and the sending unit 1105 is further configured to send the master quorum node preemption failure response message to each of the quorum nodes sending all the cached master quorum node preemption requests, so that the quorum nodes sending all the cached master quorum node preemption requests send new master quorum node preemption requests to the quorum storage apparatus again.

Further, the execution unit 1104 is further configured to: when it is determined that the quorum node sending each master quorum node preemption request received within the master quorum node preemption detection period does not include the initial master quorum node, generate a master quorum node preemption failure response message; and the sending unit 1105 is further configured to send the master quorum node preemption failure response message to the quorum node sending each master quorum node preemption request received within the master quorum node preemption detection period, so that the quorum node sending each master quorum node preemption request received within the master quorum node preemption detection period sends a new master quorum node preemption request to the quorum storage apparatus again.

Further, the receiving unit 1101 is further configured to: after the sending unit sends a master quorum node preemption success response message to the quorum node succeeding in master quorum node preemption, receive a first permission control message sent by the quorum node succeeding in master quorum node preemption, where the first permission control message includes an identifier of a first-category quorum node that does not connect to the quorum node succeeding in master quorum node preemption in the at least two quorum nodes in the cluster; the execution unit 1104 is further configured to generate an access denial notification message according to the first permission control message sent by the quorum node succeeding in master quorum node preemption; and the sending unit 1105 is further configured to send the access denial notification message to the first-category quorum node, to instruct the first-category quorum node to perform a node restart operation.

Further, the receiving unit 1101 is further configured to: after the sending unit sends a master quorum node preemption success response message to the quorum node succeeding in master quorum node preemption, receive a second permission control message sent by the quorum node succeeding in master quorum node preemption, where the second permission control message includes an identifier of a second-category quorum node that connects to the quorum node succeeding in master quorum node preemption in the at least two quorum nodes; the execution unit 1004 is further configured to generate a master quorum node preemption failure notification message according to the second permission control message sent by the quorum node succeeding in master quorum node preemption; and the sending unit 1105 is further configured to send the master quorum node preemption failure notification message to the second-category quorum node, to instruct the second-category quorum node to stop sending a master quorum node preemption request to the quorum storage apparatus.

Further, the receiving unit 1101 is further configured to: after the sending unit 1105 sends a master quorum node preemption success response message to the quorum node succeeding in master quorum node preemption, receive a permission control message sent by the quorum node succeeding in master quorum node preemption, where the permission control message includes an identifier of another quorum node except the quorum node succeeding in master quorum node preemption in the at least two quorum nodes and access permission, of the another quorum node except the quorum node succeeding in master quorum node preemption in the at least two quorum nodes, for the quorum storage apparatus, and the access permission includes admission or denial; the execution unit 1104 is further configured to generate a notification message according to the permission control message; and the sending unit 1105 is further configured to send the notification message to the another quorum node except the quorum node succeeding in master quorum node preemption in the at least two quorum nodes.

Further, the execution unit 1104 is, in some embodiments, configured to generate an access denial notification message for the first-category quorum node whose access permission is denial; and the sending unit 1105 is, in some embodiments, configured to send the access denial notification message to the first-category quorum node whose access permission is denial, to instruct the first-category quorum node to perform a node restart operation.

Further, the execution unit 1104 is, in some embodiments, configured to generate a master quorum node preemption failure notification message for the second-category quorum node whose access permission is admission, to instruct the second-category quorum node to stop sending a master quorum node preemption request to the quorum storage apparatus; and the sending unit 1005 is, in some embodiments, configured to send the master quorum node preemption failure notification message to the second-category quorum node whose access permission is admission.

Further, the execution unit 1104 is further configured to: after the sending unit sends the access denial notification message to the first-category quorum node, generate, for the first-category quorum node, a notification message used to change a firewall policy to denial, where the notification message used to change a firewall policy to denial is used to instruct the first-category quorum node to change a firewall policy in a firewall of the first-category quorum node to denial, to block a master quorum node preemption request sent by the first-category quorum node to the quorum storage apparatus; and the sending unit 1105 is further configured to send the notification message used to change a firewall policy to the first-category quorum node.

Further, the execution unit 1104 is further configured to: after the first-category quorum node performs the restart operation and re-joins the cluster, generate, for the first-category quorum node, a notification message used to change a firewall policy to admission, where the notification message used to change a firewall policy to admission is used to instruct the first-category quorum node to change a firewall policy in a firewall of the first-category quorum node to admission, to allow the first-category quorum node to send a master quorum node preemption request to the quorum storage apparatus; and the sending unit 1105 is further configured to send the notification message used to change a firewall policy to admission to the first-category quorum node.

Referring to FIG. 5, the present disclosure further provides a second embodiment of a quorum storage apparatus, where the quorum storage apparatus 500 includes:

a processor 501, a memory 502, a communications interface 503, and a bus 504, where the processor 501, the memory 502, and the communications interface 503 communicate with each other by using the bus 504;

the communications interface 503 is configured to communicate with at least two quorum nodes in a cluster;

the memory 502 is configured to store a program; and when the quorum storage apparatus 500 runs, the processor 501 is configured to execute the program stored in the memory 502, to execute the method process of the third method embodiment or the fourth method embodiment of brain split arbitration.

Referring to FIG. 8, the present disclosure further provides an arbitration processing system after cluster brain split. The system 800 includes the cluster 810 and the quorum storage apparatus 820 shown in the third embodiment of the quorum storage apparatus, where the cluster 810 includes at least two quorum nodes 811, the at least two quorum nodes 811 included in the cluster are in communication connection with the quorum storage apparatus 820, and the quorum storage apparatus 820 pre-records one of the at least two quorum nodes 811 in the cluster as the initial master quorum node 8111.

All embodiments of the present disclosure are described by using an example in which there is one quorum storage apparatus. When there are N (N≥3 and N is an odd number) quorum storage apparatuses, at least two quorum nodes in the cluster send master quorum node preemption requests to each quorum storage apparatus in the N quorum storage apparatuses. A quorum node that can obtain a master quorum node preemption success notification message sent by Round(N/2)+1 quorum storage apparatuses is referred to as a quorum node succeeding in master quorum node preemption. A node group in which the quorum node succeeding in master quorum node preemption is located is a master node group. A quorum node that can communicate with the quorum node succeeding in master quorum node preemption in the other quorum nodes may receive a master quorum node preemption failure notification message and stop sending a master quorum node preemption request to the quorum storage apparatus. A quorum node that cannot communicate with the quorum node succeeding in master quorum node preemption may receive an access denial notification message, where the access denial notification message is used to instruct the quorum node to perform a node restart operation. Because a specific processing process is similar to a processing process when there is one quorum storage apparatus, details are not described in this embodiment of the present disclosure.

It should be understood that the specific examples in the present disclosure are intended for helping a person skilled in the art understand the embodiments of the present disclosure better, but not for limiting the scope of the embodiments of the present disclosure.

It should also be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

It should be further understood that, the term "and/or" in this embodiment of the present disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing apparatus and unit, and a detailed process of the method, reference may be made to corresponding descriptions in the foregoing system embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

What is claimed is:

1. An arbitration processing method in a system comprising a cluster and a quorum storage apparatus, wherein the cluster comprises at least two quorum nodes, and the method comprises:

receiving, by the quorum storage apparatus, first master quorum node preemption requests from the at least two quorum nodes during a period of time in response to an occurrence of a brain split in the cluster, a quorum node identified as a master quorum node of the cluster before the occurrence of the brain split in the cluster;

determining, by the quorum storage apparatus, whether one of the first master quorum node preemption requests is sent by the quorum node as the master quorum node of the cluster;

selecting one of the at least two quorum nodes as the master quorum node of the cluster according to the determination, wherein the quorum node as the master quorum node of the cluster before the occurrence of the brain split in the cluster has a priority in the selection; and sending, by the quorum storage apparatus, a first master quorum node preemption success response message to the selected one of the at least two quorum nodes, wherein the first master quorum node preemption success response message indicates that the selected one of the at least two quorum nodes is assigned as the master quorum of the cluster.

2. The method according to claim 1, wherein the determination includes that the one of the first master quorum node preemption requests is not sent by the one of the at least two quorum nodes as the master quorum node of the cluster within a first master quorum node preemption detection period, the method further comprises:

receiving, by the quorum storage apparatus, second master quorum node preemption requests within a second master quorum node preemption detection period, subsequent to the first master quorum node preemption detection period, from the at least two quorum nodes in response to the occurrence of the brain split in the cluster;

assigning, by the quorum storage apparatus, a quorum node as the master quorum node of the cluster, wherein one of the second master quorum node preemption requests from the quorum node was received first subsequent to the first master quorum node preemption detection period.

3. The method according to claim 2, wherein the method further comprises:

sending, by the quorum storage apparatus, a master quorum node preemption failure response message to all quorum nodes except the quorum node.

4. The method according to claim 1, wherein the determination includes that the one of the first master quorum node preemption requests is sent by the one of the at least two quorum nodes as the master quorum node of the cluster within a first master quorum node preemption detection period, and wherein the one of the at least two quorum nodes remains as the master quorum of the cluster.

5. The method according to claim 4, wherein the method further comprises:

receiving, by the quorum storage apparatus, a first permission control message sent by the one of the at least two quorum nodes, wherein the first permission control message comprises an identifier of a first-category quorum node that does not connect to the one of the at least two quorum nodes; and sending, by the quorum storage apparatus, an access denial notification message to the first-category quorum node, to instruct the first-category quorum node to perform a node restart operation.

6. The method according to claim 4, wherein the method further comprises:
- receiving, by the quorum storage apparatus, a second permission control message sent by the one of the at least two quorum nodes, wherein the second permission control message comprises an identifier of a second-category quorum node that connects to the one of the at least two quorum nodes; and
- sending, by the quorum storage apparatus, a master quorum node preemption failure notification message to the second-category quorum node, to instruct the second-category quorum node to stop sending a master quorum node preemption request to the quorum storage apparatus.

7. The method according to claim 5, wherein the method further comprises:
- sending, by the quorum storage apparatus, a notification message for changing a firewall policy, the notification message to instruct the first-category quorum node to block a master quorum node preemption request to the quorum storage apparatus.

8. The method according to claim 5, wherein the method further comprises:
- sending, by the quorum storage apparatus, a notification message for changing a firewall policy, the notification message to instruct the first-category quorum node to allow a master quorum node preemption request to the quorum storage apparatus when the first-category quorum node performs the node restart operation and re-joins the cluster.

9. A physical quorum storage apparatus comprising:
- a memory comprising instructions; and
- one or more processors coupled to the memory, wherein the one or more processors execute the instructions to perform:
- receiving first master quorum node preemption requests from at least two quorum nodes during a period of time in a cluster in response to an occurrence of a brain split in the cluster, a quorum node identified as a master quorum node of the cluster before the occurrence of the brain split in the cluster;
- determining whether one of the first master quorum node preemption requests is sent by the quorum node as the master quorum node of the cluster;
- selecting one of the at least two quorum nodes as the master quorum node of the cluster according to the determination, wherein the quorum node as the master quorum node of the cluster before the occurrence of the brain split in the cluster has a priority in the selection; and
- sending a first master quorum node preemption success response message to the selected one of the at least two quorum nodes, wherein the first master quorum node preemption success response message indicates that the selected one of the at least two quorum nodes is assigned as the master quorum of the cluster.

10. The quorum storage apparatus according to claim 9, wherein the determination includes that the one of the first master quorum node preemption requests is not sent by the one of the at least two quorum nodes as the master quorum node of the cluster within a first master quorum node preemption detection period, the one or more processors execute the instructions to perform:
- receiving second master quorum node preemption requests within a second master quorum node preemption detection period, subsequent to the first master quorum node preemption detection period, from the at least two quorum nodes in response to the occurrence of the brain split in the cluster;
- assigning a quorum node as the master quorum node of the cluster, wherein one of the second master quorum node preemption requests from the quorum node was received first subsequent to the first master quorum node preemption detection period.

11. The quorum storage apparatus according to claim 10, wherein the one or more processors execute the instructions to perform:
- sending a master quorum node preemption failure response message to all quorum nodes except the quorum node.

12. The quorum storage apparatus according to claim 9, wherein the determination includes that the one of the first master quorum node preemption requests is sent by the one of the at least two quorum nodes as the master quorum node of the cluster within a first master quorum node preemption detection period, the one of the at least two quorum nodes remains as the master quorum of the cluster.

13. The quorum storage apparatus according to claim 12, wherein the one or more processors executes the instructions to perform:
- receiving a first permission control message sent by the one of the at least two quorum nodes, wherein the first permission control message comprises an identifier of a first-category quorum node that does not connect to the one of the at least two quorum nodes; and
- sending an access denial notification message to the first-category quorum node, to instruct the first-category quorum node to perform a node restart operation.

14. The quorum storage apparatus according to claim 12, wherein the processor execute the instructions to perform:
- receiving a second permission control message sent by the one of the at least two quorum nodes, wherein the second permission control message comprises an identifier of a second-category quorum node that connects to the one of the at least two quorum nodes; and
- sending a master quorum node preemption failure notification message to the second-category quorum node, to instruct the second-category quorum node to stop sending a master quorum node preemption request to the quorum storage apparatus.

15. The quorum storage apparatus according to claim 13, wherein the one or more processors execute the instructions to perform:
- sending a notification message for changing a firewall policy, the notification message to instruct the first-category quorum to block a master quorum node preemption request to the quorum storage apparatus.

16. The quorum storage apparatus according to claim 13, wherein the one or more processors execute the instructions to perform:
- sending a notification message for changing a firewall policy, the notification message to instruct the first-category quorum node to allow a master quorum node preemption request to the quorum storage apparatus when the first-category quorum node performs the node restart operation and re-joins the cluster.

17. An arbitration processing system comprising:
- a cluster and a physical quorum storage apparatus, wherein the cluster comprises at least two quorum nodes, each of the at least two quorum nodes comprising a first memory and one or more first processors coupled to the first memory;
- wherein the quorum storage apparatus, comprising a second memory and one or more second processors coupled to the second memory, wherein the one or more second processors execute instructions in the second memory to perform:
  receiving first master quorum node preemption requests from the at least two quorum nodes during a period of time in response to an occurrence of a brain split in the cluster, a quorum node identified as a master quorum node of the cluster before the occurrence of the brain split in the cluster,
  determining whether one of the first master quorum node preemption requests is sent by the quorum node as the master quorum node of the cluster,
  selecting one of the at least two quorum nodes as the master quorum node of the cluster according to the determination, wherein the quorum node as the master quorum node of the cluster before the occurrence of the brain split in the cluster has a priority in the selection; and
  sending a first master quorum node preemption success response message to the selected one of the at least two quorum nodes, wherein the first master quorum node preemption success response message indicates that the selected one of the at least two quorum nodes is assigned as the master quorum of the cluster.

18. The arbitration processing system according to claim 17, wherein the determination includes that the one of the first master quorum node preemption requests is not sent by the one of the at least two quorum nodes as the master quorum node of the cluster within a first master quorum node preemption detection period, the one or more second processors execute the instructions in the second memory to perform:
  receiving second master quorum node preemption requests within a second master quorum node preemption detection period, subsequent to the first master quorum node preemption detection period, from the at least two quorum nodes in response to the occurrence of the brain split in the cluster; and
  assigning a quorum node as the master quorum node of the cluster, wherein one of the second master quorum node preemption requests from the quorum node was received first subsequent to the first master quorum node preemption detection period.

19. The arbitration processing system according to claim 18, wherein the one or more second processors execute the instructions in the second memory to perform:
  sending a master quorum node preemption failure response message to all quorum nodes except the quorum node.

20. The arbitration processing system according to claim 17, wherein the determination includes that the one of the first master quorum node preemption requests is sent by the one of the at least two quorum nodes as the master quorum node of the cluster within a first master quorum node preemption detection period, the one of the at least two quorum nodes remains as the master quorum of the cluster.

21. The arbitration processing system according to claim 20, wherein the one or more second processors execute the instructions in the second memory to perform: receiving a first permission control message from the one of the at least two quorum nodes master quorum node, wherein the first permission control message comprises an identifier of a first-category quorum node that does not connect to the one of the at least two quorum nodes; and
  sending an access denial notification message to the first-category quorum node, to instruct the first-category quorum node to perform a node restart operation.

22. The arbitration processing system according to claim 20, wherein the one or more second processors execute the instructions in the second memory to perform:
  receiving a second permission control message sent by the one of the at least two quorum nodes, wherein the second permission control message comprises an identifier of a second-category quorum node that connects to the one of the at least two quorum nodes; and
  sending a master quorum node preemption failure notification message to the second-category quorum node, to instruct the second-category quorum node to stop sending a master quorum node preemption request to the quorum storage apparatus.

23. The arbitration processing system according to claim 21, wherein the one or more second processors execute the instructions in the second memory to perform:
  sending a notification message for changing a firewall policy, the notification message to instruct the first-category quorum node to block a master quorum node preemption request to the quorum storage apparatus.

* * * * *